(12) United States Patent
Manz et al.

(10) Patent No.: US 11,431,210 B2
(45) Date of Patent: Aug. 30, 2022

(54) LAMINATION, STATOR AND ELECTRIC MOTOR HAVING TIP PAIRS FOR STATOR TEETH

(71) Applicant: Regal Beloit America, Inc., Beloit, WI (US)

(72) Inventors: Alan Jacob Manz, Paulding, OH (US); Kamron Mark Wright, Fort Wayne, IN (US); John Sheldon Wagley, Winona Lake, IN (US); Lester Benjamin Manz, Paulding, OH (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 896 days.

(21) Appl. No.: 16/053,107

(22) Filed: Aug. 2, 2018

(65) Prior Publication Data

US 2020/0044498 A1 Feb. 6, 2020

(51) Int. Cl.
| | |
|---|---|
| *H02K 1/16* | (2006.01) |
| *H02K 3/12* | (2006.01) |
| *H02K 1/04* | (2006.01) |
| *H02K 3/46* | (2006.01) |
| *H02K 1/06* | (2006.01) |
| *H02K 3/48* | (2006.01) |

(52) U.S. Cl.
CPC ............... *H02K 1/165* (2013.01); *H02K 1/04* (2013.01); *H02K 1/16* (2013.01); *H02K 3/12* (2013.01); *H02K 1/06* (2013.01); *H02K 3/46* (2013.01); *H02K 3/48* (2013.01)

(58) Field of Classification Search
CPC .. H02K 1/04; H02K 1/06; H02K 1/16; H02K 1/165; H02K 3/12; H02K 3/46; H02K 3/48; H02K 3/487
USPC .................................. 310/208, 214, 216.001
See application file for complete search history.

(56) References Cited

U.S. PATENT DOCUMENTS

| | | | |
|---|---|---|---|
| 3,226,581 | A | 12/1965 | Brewster et al. |
| 4,372,039 | A | 2/1983 | Bailey |
| 4,859,974 | A | 8/1989 | Kliman et al. |
| 5,493,159 | A | 2/1996 | Norris |
| 6,353,276 | B1 | 3/2002 | Gendron |
| 6,584,813 | B2 | 7/2003 | Peachee et al. |
| 6,700,284 | B2 | 3/2004 | Williams et al. |
| 6,750,575 | B2 | 6/2004 | Wright |
| 6,897,591 | B2 | 5/2005 | Peachee et al. |
| 7,012,350 | B2 | 3/2006 | Peachee et al. |
| 8,896,178 | B2 | 11/2014 | Nishiyama et al. |

(Continued)

*Primary Examiner* — Rashad H Johnson
(74) *Attorney, Agent, or Firm* — Armstrong Teasdale LLP

(57) ABSTRACT

A lamination for use in an electric machine stator includes a body having a generally circular outer periphery and a generally circular inner periphery, spaced from the outer periphery and a plurality of spaced apart teeth extending inwardly from the circular inner periphery. Each of said teeth define opposed inner edges thereof. The lamination includes a first pair of tips extending tangentially in opposed directions from the inner edge of one of said teeth and a second pair of tips extending tangentially in opposed directions from the inner edges of another one of said teeth. A tip of the first pair of tips and a tip of the second pair of tips define a first configuration having a first gap therebetween and defining a second configuration having a second gap therebetween. The first gap being substantially less than the second gap.

10 Claims, 23 Drawing Sheets

(56) References Cited

U.S. PATENT DOCUMENTS

| | | | |
|---|---|---|---|
| 10,020,702 B2 | 7/2018 | Mathoy et al. | |
| 2002/0139606 A1 | 10/2002 | Williams et al. | |
| 2004/0251763 A1 | 12/2004 | Tamaki et al. | |
| 2010/0127592 A1 | 5/2010 | Yu et al. | |
| 2011/0025165 A1* | 2/2011 | Naganawa | H02K 1/165 |
| | | | 310/216.069 |
| 2013/0002058 A1* | 1/2013 | McIntosh | H02K 1/185 |
| | | | 310/43 |
| 2014/0217837 A1* | 8/2014 | Jaganjac | H02K 1/148 |
| | | | 310/68 D |
| 2016/0329793 A1* | 11/2016 | Li | H02K 3/18 |
| 2017/0117760 A1* | 4/2017 | Greenlaw | H02K 1/02 |
| 2017/0222501 A1* | 8/2017 | Chu | F04D 29/663 |
| 2018/0188187 A1 | 7/2018 | Lakhani et al. | |
| 2018/0367001 A1* | 12/2018 | Shelton | H02K 1/185 |

* cited by examiner

LAMINATION, STATOR AND ELECTRIC MOTOR HAVING TIP PAIRS FOR STATOR TEETH

BACKGROUND OF THE INVENTION

The embodiments described herein relate generally to electrical machines, and more specifically, to a stator fabricated from a plurality of laminations.

An electric machine is typically in the form of an electric generator or an electric motor. The machine typically has a centrally located shaft that rotates relative to the machine. Electrical energy applied to coils within the motor initiates this relative motion which transfers the power to the shaft and, alternatively, mechanical energy from the relative motion of the generator excites electrical energy into the coils. For expediency the machine will be described hereinafter as a motor. It should be appreciated that a motor may operate as a generator and vice versa.

A stationary assembly, also referred to as a stator, includes a stator core and coils or windings positioned around portions of the stator core. It is these coils to which energy is applied to initiate this relative motion which transfers the power to the shaft. These coils are formed by winding wire, typically copper, aluminum or a combination thereof, about a central core to form the winding or coil.

In an assembled configuration the coils are positioned in a spaced apart relationship about the stationary assembly that typically has a generally hollow cylindrical configuration with the coils positioned internally. The power of the electric motor is dependent on the amount of energy that may be applied to the coils and that amount of energy is proportional to the amount of wire that may be positioned about the stationary assembly. The amount of wire positioned about the stationary assembly is typically referred to as the slot fill. Placing as much wire in the coils as possible, also known as maximizing the slot fill is thus desirable.

Of many methods of manufacturing the stator and winding the wire to form the coil in particular, the following three methods are typical. The first is to form a rigid hollow cylindrical core with internal protrusions of teeth around which the coils are wound. The core is typically produced by stacking a plurality of rigid hollow laminations and joining them to form the rigid hollow cylindrical core. This method requires the wire to be fed around the teeth with a device called a needle. The need to provide for movement of the needle around the teeth limits the amount of wire that may be used to form the coil.

The space between adjacent teeth when the rotor rotates about the stator to produce torque and power in the motor to propel machinery etc., causes non-uniformity in torque as the motor rotates. This non-uniformity is commonly called "cogging torque" and leads to motor and resultant machinery noise and/or vibration.

To reduce this cogging torque, tips or protrusion have been added to the radially inward teeth edges to reduce the effective space between adjacent teeth. The tips or protrusion, however, further limit access to the cavities between adjacent teeth where the coils are formed during the winding. Note the needle needs to pass between adjacent teeth and thus between the adjacent tips or protrusion, making the coil making process slow and costly, as well as, limits the amount of wire that may be used to form the coil.

The present invention is directed to alleviate at least some of these problems with the prior art.

BRIEF DESCRIPTION OF THE INVENTION

According to an aspect of the invention, a lamination for use in an electric machine stator includes a body having a generally circular outer periphery and a generally circular inner periphery, spaced from the outer periphery and a plurality of spaced apart teeth extending inwardly from the circular inner periphery. Each of the teeth define opposed inner edges thereof. The lamination includes a first pair of tips extending tangentially in opposed directions from the inner edge of one of the teeth and a second pair of tips extending tangentially in opposed directions from the inner edges of another one of the teeth. A tip of the first pair of tips and a tip of the second pair of tips define a first configuration having a first gap therebetween and defining a second configuration having a second gap therebetween. The first gap being substantially less than the second gap.

According to another aspect of the invention, the lamination may be provided wherein at least one of the tip of the first pair of tips and the tip of the second pair of tips includes a living hinge.

According to another aspect of the invention, the lamination may be provided wherein least one of the tip of the first pair of tips and the tip of the second pair of tips includes a first portion and a second portion, the first portion pivotally connected to the second portion.

According to another aspect of the invention, the lamination may be provided wherein at least one of the tip of the first pair of tips and the tip of the second pair of tips includes a first portion having a radially inward face and a second portion having a radially inward face, the first portion pivotally connected to the second portion at the radially inward face of the first portion and at the radially inward face of the second portion.

According to another aspect of the invention, the lamination may be provided wherein in first configuration the tip of the first pair of tips and the tip of the second pair of tips are in contact with each other.

According to another aspect of the invention, the lamination may be provided wherein in first configuration the tip of the first pair of tips and the tip of the second pair of tips are in interference contact with each other.

According to another aspect of the invention, the lamination may be provided wherein in first configuration the tip of the first pair of tips and the tip of the second pair of tips further include a magnetically insulative material positioned between the tip of said first pair of tips and the tip of said second pair of tips According to another aspect of the invention, the lamination may be provided wherein in first configuration the tip of the first pair of tips has a concave shape and the tip of the second pair of tips has a convex shape.

According to another aspect of the invention, a stator for an electric machine is provided. The electric machine includes a plurality of laminations. Each of the plurality of laminations define opposed planar faces. The plurality of laminations are joined to each other at the planar faces thereof. Each of the plurality of laminations includes a body have a generally circular outer periphery and a generally circular inner periphery, spaced from the outer periphery. Each of the plurality of laminations also includes a plurality of spaced apart teeth extending inwardly from the circular inner periphery. Each of the teeth define opposed inner edges thereof; a first pair of tips extending tangentially in opposed directions from the inner edge of one of the teeth; and a second pair of tips. The second pair of tips extending tangentially in opposed directions from the inner edges of another one of the teeth. A tip of the first pair of tips and a tip of the second pair of tips define a first configuration defining a first gap therebetween and defining a second configuration defining a second gap therebetween. The first gap is substantially less than the second gap. The electric machine also includes wire formed into a plurality of coils, each of the plurality of coils wrapped around one of the plurality of teeth.

According to another aspect of the invention, the stator may be provided wherein at least one of the tip of the first pair of tips and the tip of the second pair of tips includes a living hinge.

According to another aspect of the invention, the stator may be provided wherein at least one of the tip of the first pair of tips and the tip of the second pair of tips includes a first portion and a second portion, the first portion pivotally connected to the second portion.

According to another aspect of the invention, the stator may be provided wherein at least one of the tip of the first pair of tips and the tip of the second pair of tips includes a first portion having a radially inward face and a second portion having a radially inward face. The first portion is pivotally connected to the second portion at the radially inward face of the first portion and at the radially inward face of the second portion.

According to another aspect of the invention, the stator may be provided wherein in first configuration the tip of the first pair of tips and the tip of the second pair of tips are in contact with each other.

According to another aspect of the invention, the stator may be provided wherein in first configuration the tip of the first pair of tips and the tip of the second pair of tips are in interference contact with each other.

According to another aspect of the invention, the stator may be provided wherein in first configuration the tip of the first pair of tips has a concave shape and the tip of the second pair of tips has a convex shape at least one of the tip of the first pair of tips and the tip of the second pair of tips includes a first portion and a second portion, the first portion pivotally connected to the second portion.

According to another aspect of the invention, the stator may be provided wherein at least one of the tip of the first pair of tips and the tip of the second pair of tips includes a first portion and a second portion, the first portion pivotally connected to the second portion.

According to another aspect of the invention, the stator may be provided wherein at least one of a tip of the first pair of tips and a tip of the second pair of tips define a deformed configuration defining a first gap therebetween and defining an undeformed configuration defining a second gap therebetween. The first gap is substantially less than the second gap.

According to another aspect of the invention, an electric machine is provided. The electric machine includes a housing. The housing has an inner surface defining a cavity therein. The electric machine also includes a rotor, rotatably secured to the housing and a stator secured to the housing.

The stator includes a body have a generally circular outer periphery and a generally circular inner periphery, spaced from the outer periphery.

The stator also includes a plurality of spaced apart teeth extending inwardly from the circular inner periphery. Each of the teeth define opposed inner edges thereof, a first pair of tips and a second pair of tips.

The first pair of teeth extend tangentially in opposed directions from the inner edges of a first tooth of the plurality of spaced apart teeth.

The second pair of tips extend tangentially in opposed directions from the inner edges of a second tooth of the plurality of spaced apart teeth. The second pair of tips are removable from the second tooth.

One tip of the second pair of tips and one tip of the first pair of tips define a first configuration defining a first gap therebetween. The second tooth and one tip of the first pair of tips define a second gap between the tip and the second tooth. The first gap is substantially less than the second gap; and The stator also includes wire formed into a plurality of coils, each of the plurality of coils wrapped around one of the plurality of teeth.

According to another aspect of the invention, the electric machine may be provided wherein the second pair of tips includes a tooth cap, removably secured to the second tooth.

According to another aspect of the invention, the electric machine may be provided wherein every other tooth of the plurality of teeth includes a tooth cap.

According to another aspect of the invention, the electric machine may be provided wherein the tooth cap is one of interferencely fitted, tapered fitted, or glued to the second tooth.

According to another aspect of the invention, the electric machine may be provided wherein the tooth cap includes one of a cavity and a protrusion.

According to another aspect of the invention, the electric machine may be provided wherein the second tooth includes the other one of a cavity and a protrusion.

According to another aspect of the invention, the electric machine may be provided wherein the cavity and the protrusion cooperate to secure the cap to the tooth.

According to another aspect of the invention, the electric machine may be provided wherein the protrusion includes a dovetail.

According to another aspect of the invention, the electric machine may be provided wherein at least one of the tip of the first pair of tips and the tip of the second pair of tips include a living hinge.

According to another aspect of the invention, the electric machine may be provided wherein the body of the stator comprises a plurality of generally planar laminations, wherein each of the plurality of laminations include a portion of one of the tips of the first pair of tips and a portion of one of the tips of the second pair of tips.

Further the electric machine may be provided wherein the portion of the one of the tips of the first pair of tips of each of the plurality of laminations and the portion of the one of the tips of the second pair of tips of each of the plurality of laminations being in intimate contact with each other;

Further the electric machine may be provided wherein the tips of at least some of the tips of the first pair of tips and the tips of at least some of the tips of the second pair of tips being spaced from each other.

Further the electric machine may be provided wherein the portion of the one of the tips of the first pair of tips of each of the plurality of laminations and the portion of the one of the tips of the second pair of tips of each of the plurality of laminations in intimate contact with each other of adjacent laminations being skewed with respect to each other.

DETAILED DESCRIPTION OF THE INVENTION

The method, systems and apparatus described herein facilitate the winding of wire to form a coil within an electric machine. Wire is wound around teeth or bobbins to form coils. To optimize wire fill and motor power the wire is optimally uniformly wound with adjacent wires in a closely uniformly packed relationship. Difficulties may occur maintaining this closely uniformly packed relationship. Added care may alleviate difficulties with such closely uniformly packed relationship, but may reduce productivity and add costs to the electric machine.

The methods, systems, and apparatus described herein assist in the proper closely uniformly packed relationship of the wires within motor coils. The methods, systems, and apparatus described herein may also facilitate assembly speed and accuracy. Furthermore, the methods, systems, and apparatus described herein provide for an improved appearance of the motor and its appeal to the customer.

Technical effects of the methods, systems, and apparatus described herein include at least one of improved performance and quality and reduced labor costs.

Figure 1:
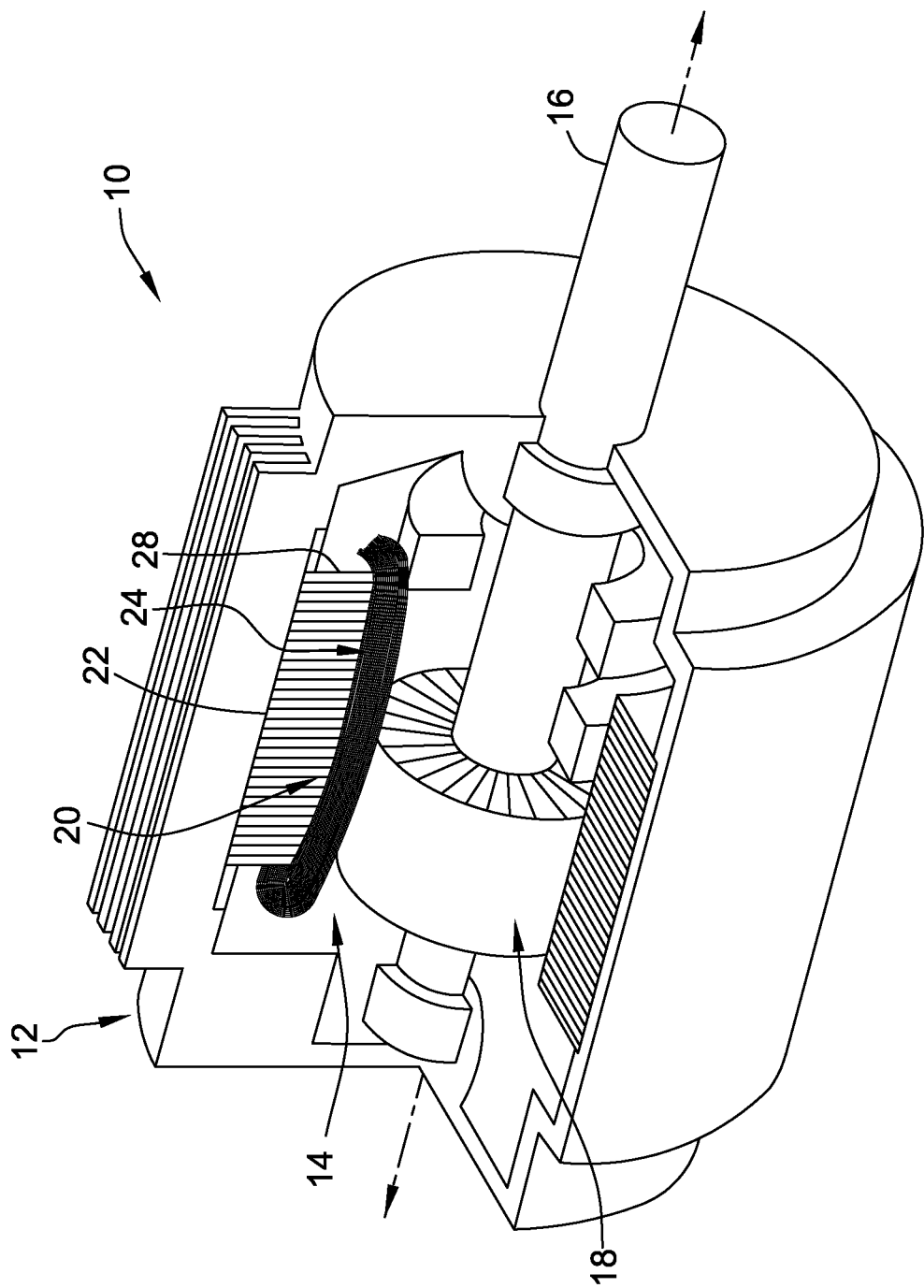
FIG. 1 is a perspective view of an embodiment of the present invention in the form of an electric machine.

Referring to FIG. 1 and according to another aspect of the invention, an electric machine 10 is provided. The electric machine 10 is typically in the form of an electric generator or an electric motor. For expediency the machine 10 will be described hereinafter as a motor 10. It should be appreciated that a motor may operate as a generator and vice versa. The electric machine or motor 10 includes a housing 12. The housing 12 has an inner surface defining a cavity 14 therein.

Typically, the motor 10 includes a centrally located shaft 16 that rotates relative to the housing 12. The electric machine also includes a rotor 18. Typically, and as shown in FIG. 1, the rotor 18 includes the shaft 16 to which a load, not shown, is typically directly or indirectly secured. As shown, the rotor 18 is rotatably secured to the housing 12.

Figure 2:
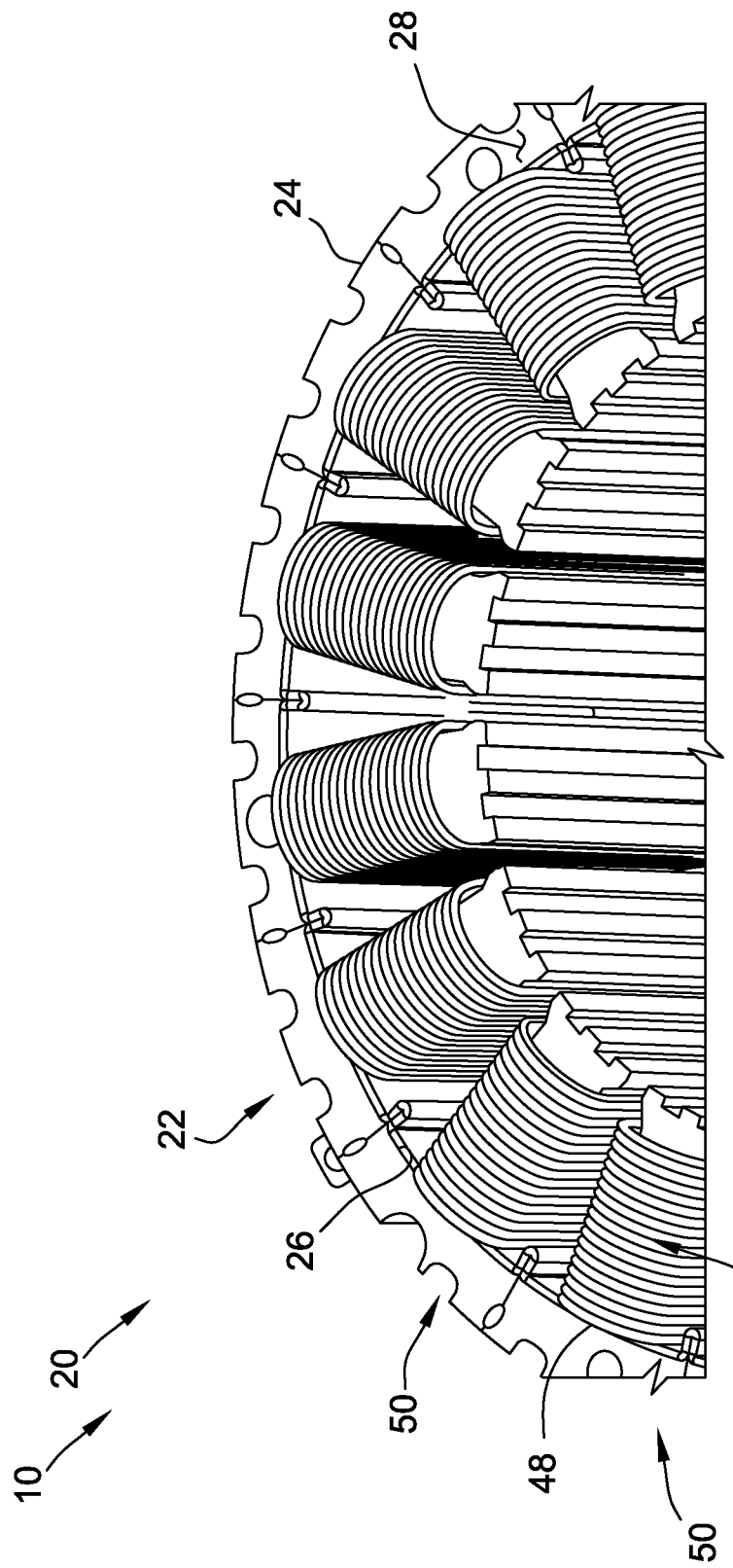
FIG. 2 is a perspective view of the stator assembly of the electric machine of FIG. 1.

As shown in FIG. 1 and FIG. 2, the motor 10 includes a stator 20 secured to the housing 12. The stator 20 includes a stator body 22 that has a generally circular outer periphery 24 and a generally circular inner periphery 26, spaced from the outer periphery 24.

While the body 22 may be made of various suitable materials, may be unitary or made from multiple components, as shown in FIG. 1, the body 22 is made from a plurality of sheets or laminations 28. The laminations 28 are typically made of a magnetically conductive material, for example, of a ferrous material or a magnetically conductive composite.

Figure 3:
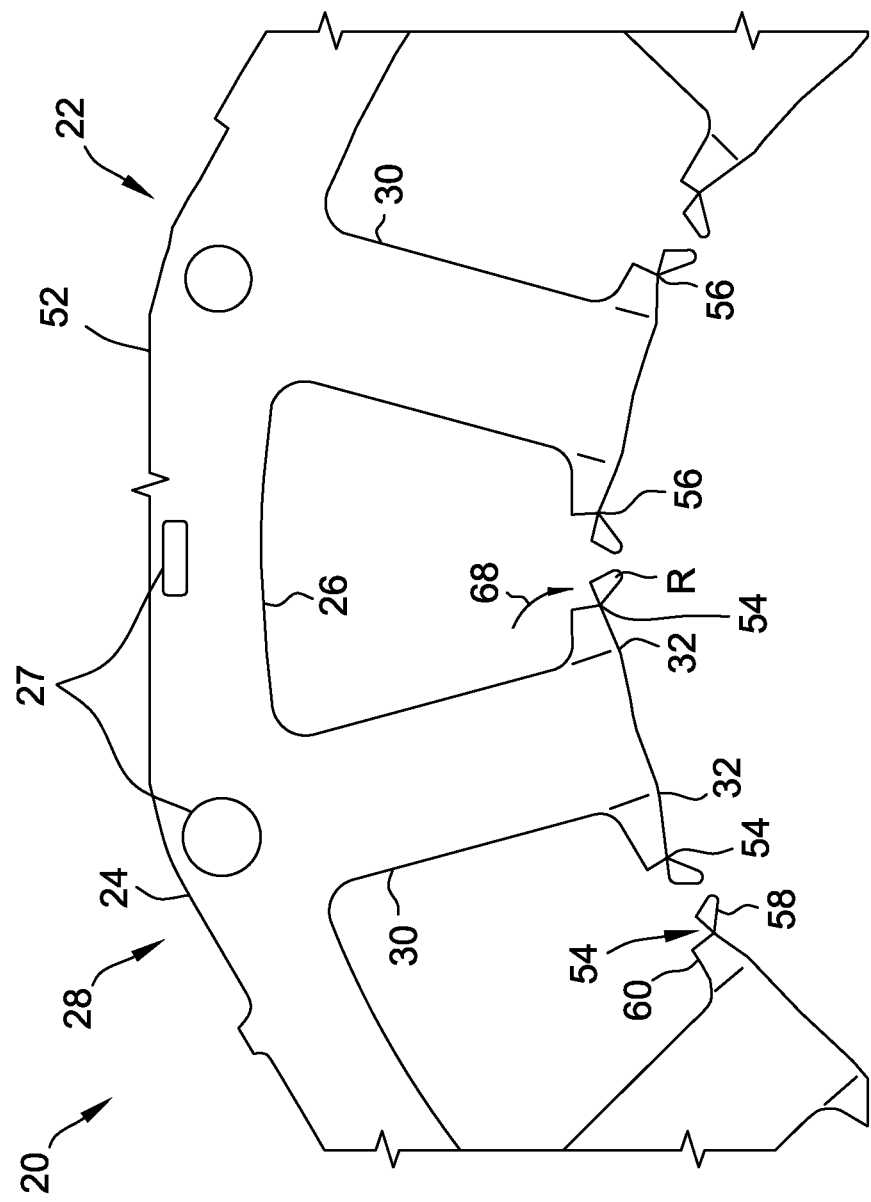
FIG. 3 is a partial plan view of a stator lamination for use in providing a stator for use in the stator assembly of FIG. 2 with the tooth tip in the winding position to assist access to the stator pockets for winding.

Referring now to FIG. 3, one of the laminations 28 used to provide the stator 20 is shown in greater detail. Typically, the body 22 is made from laminations 28. Each of the laminations 28 includes a plurality of spaced apart teeth 30 extending inwardly from the circular inner periphery 26, Each of the teeth 30 define radially inner edges 32 thereof.

Figure 4:
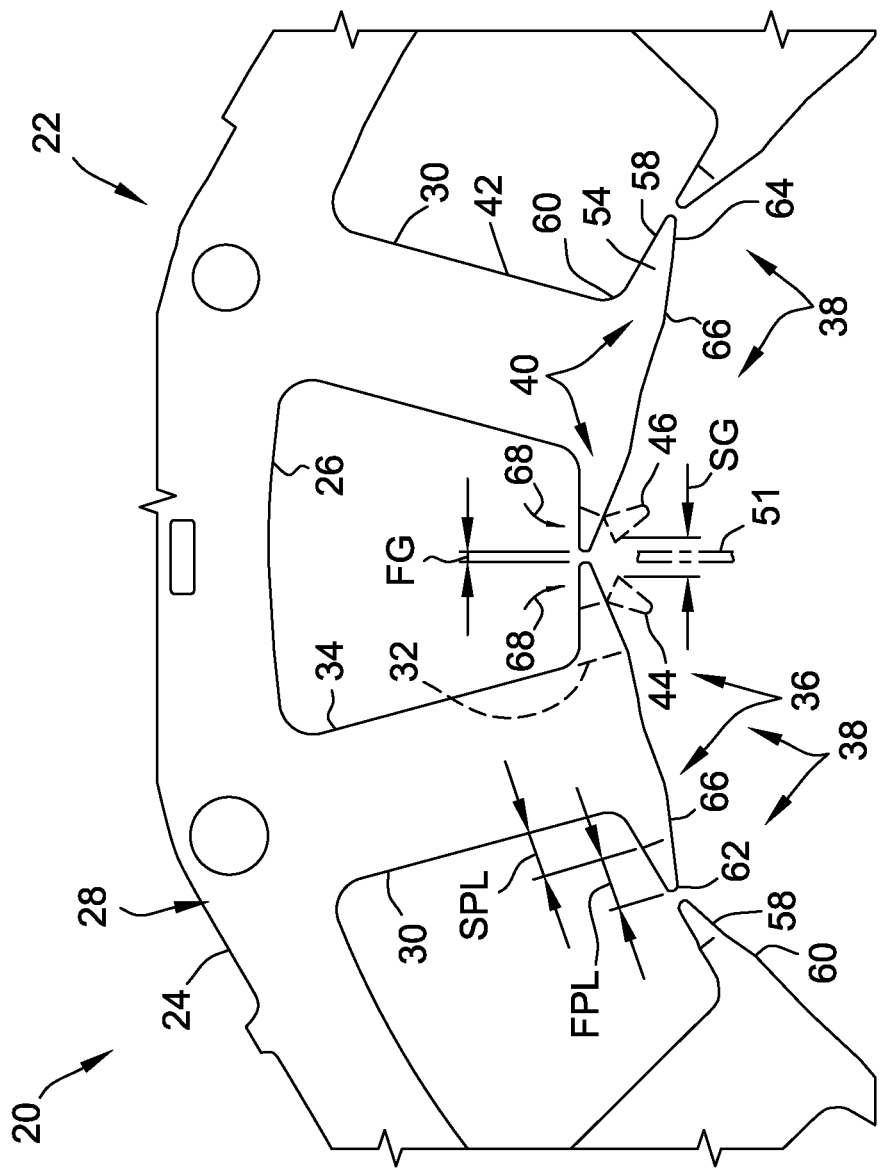
FIG. 4 is a partial plan view of the stator lamination of FIG. 3 with the tooth tips in the machine operating position.

Referring now to FIG. 4, a first tooth 34 of the teeth 30 includes a first pair 36 of tips 38 extend tangentially in opposed directions from the radially inner edge 32 of the first tooth 34, A second pair 40 of tips 38 extend tangentially in opposed directions from the radially inner edge of a second tooth 42.

A tip 44 of the first pair 36 of tips and a tip 46 of the second pair 40 of tips define a first configuration defining a first gap FG therebetween and defining a second configuration defining a second gap SG therebetween, the first gap FG being substantially less than the second gap SG.

Referring again to FIG. 2, the stator 20 also includes wire 48 formed into a plurality of coils 50, each of the plurality of coils 50 wrapped around one of the plurality of teeth 30. Note that the second gap SG provides added room for a needle 51 or other tool to wind the wire 48 around the teeth 30 to form the coils 50.

Referring again to FIGS. 3 and 4, the lamination 28 for use in the electric machine stator 20 includes a lamination body 52 having a generally circular outer periphery 24 and a generally circular inner periphery 26, spaced from the outer periphery 24 and a plurality of spaced apart teeth 30 extending inwardly from the circular inner periphery 26.

The laminations may include voids 27, in the form of cylindrical shaped voids and rectangular shaped voids 27 that may mate with pins or rods to connect adjacent laminations of to secure opposed end portions (not shown).

As shown in FIGS. 3 and 4 and according to another aspect of the invention, the lamination 28 may be provided wherein at least one of the tips 38 of the first pair 36 of tips 38 includes a first living hinge 54.

The living hinge 54 may be provided by manufacturing the lamination 28 from a pliable or ductile material, for example a ferrous metal, for example a metal suitable for stamping to form stator laminations 28 and by providing an area of reduced cross sectional area where the lamination may be bent to, for example provided for the first gap FG and for the second gap SG (see FIG. 4).

While the lamination 28 may be provided with a single living hinge 54 and still provide for a larger second gap SG to assist in winding wires 48 around, to provide for an even larger second gap SG, the lamination may be configured, as shown in FIGS. 3 and 4 with the tip 38 of the second pair 40 of tips 38 including a second living hinge 56.

To provide for a living hinge 54, the lamination 28 may be provided, as shown in FIGS. 3 and 4, wherein each tip 38 of the first pair 36 of tips 38 and each tip 38 of the second pair 40 of tips 38 includes a first portion 58 and a second portion 60, the first portion 58 pivotally connected to the second portion 60 at an area of reduced cross section forming the living hinge 54.

The second portion 60 of the tip 38 extends a distance or Second Portion Length SPL from the edge 32 of tooth 30 to the living hinge 54. The first portion 58 of the tip 38 extends a distance or First Portion Length FPL from the living hinge 54 to the distal edge 62 of tip 38.

It should be appreciated that by making the First Portion Length FPL greater and the Second Portion Length SPL smaller, Second Gap SG can be made larger, to accommodate an even larger needle 51.

While it should be appreciated that the living hinge may be positioned anywhere between the first portion 58 of the tip 38 and the second portion 60 of the tip 38, according to another aspect of the invention and as shown in FIGS. 3 and 4, the lamination 28 may be provided such that the first portion 58 has a radially inward face 64 and the second portion 60 having a radially inward face 66. As shown, the first portion 58 is pivotally connected to the second portion 60 at the radially inward face 64 of the first portion 58 and at the radially inward face 66 of the second portion 60. This positioning of the living hinge 54 permits the first portion 58 to pivot in direction of arrow 68 to permit more complete filling of the spaces between adjacent teeth 30 with wire 48.

Referring to FIGS. 3 and 4 and according to another aspect of the invention, it should be appreciated that the First Gap FG may be made very small. The smaller the First Gap the smaller that undesirable cogging torque may become. However, a small First Gap or even a First Gap of zero, may create magnetic flux path between adjacent tips 38 that are undesirable.

Having a zero dimension for the First Gap FG or even having the adjacent tooth tips 38 in interference may provide strength and stability to the tips 38. The adjacent tips 38 may have the distal edges 62 defined by a radius R, of for example 0.002-0.050 inches, as shown.

Figure 5:
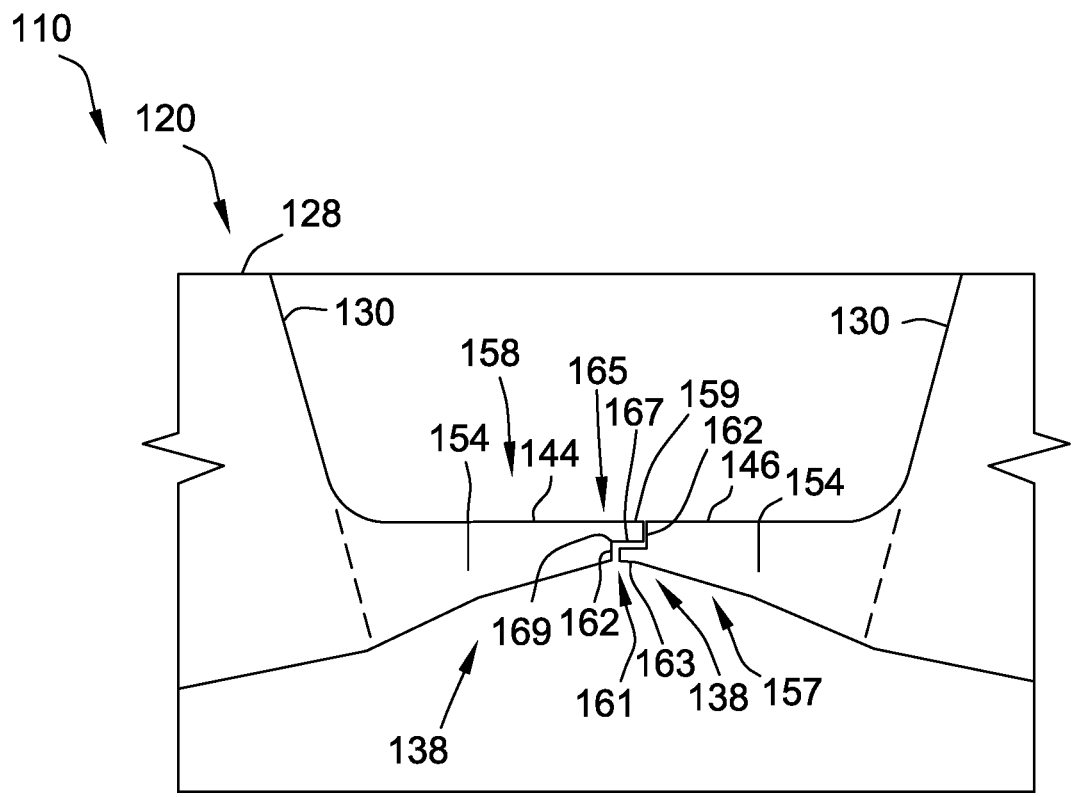
FIG. 5 is a partial plan view of a stator lamination according to another embodiment of the present invention with the tooth tips from adjacent teeth in intimate contact and with the contacting tips having rectangular cross sections and blunt tips with the tooth tips in the machine operating position.

According to another aspect of the present invention and referring now to FIG. 5, lamination 128 is shown for use in a stator 120 for use in a motor 110. As shown, adjacent tooth tips 138, may be placed in contact with each other or in interference engagement with each other. To minimize or eliminate magnetic flux path between adjacent tips 138 that are undesirable, a magnetically non-conductive coating 167 over the tips 138 may reduce or eliminate the undesirable magnetic flux path between adjacent tips 138.

It should be appreciated that the magnetic flux path between adjacent tips when adjacent tooth tips are placed in contact with each other may alternatively may be reduced by providing a separate component 169 in the form of a separate magnetically non-conductive material or separator 169 in addition to the coating 167 or in place of the coating 167. The separator 169 may be in the form of a polymer sheet, for example, a Mylar® sheet. Mylar is a registered trademark owned by Dupont Tejjin Films for a specific family of plastic sheet products made from the resin Polyethylene Terephthalate (PET).

As shown in FIG. 5, the lamination 128 may be provided wherein, when in the first or the operating configuration as shown, the tooth tips 138 from adjacent teeth 130 are in intimate contact. A first tip 144 has a moveable first portion 158 that has a rectangular protrusion 159 with a blunt distal end 162 and rectangular void 161 that mates with a rectangular void 165 and a rectangular protrusion 163 of moveable first portion 157 of a second tip 146. As shown, living hinges 154 enable the first portions 157 and 158 to be moveable.

Figure 6:
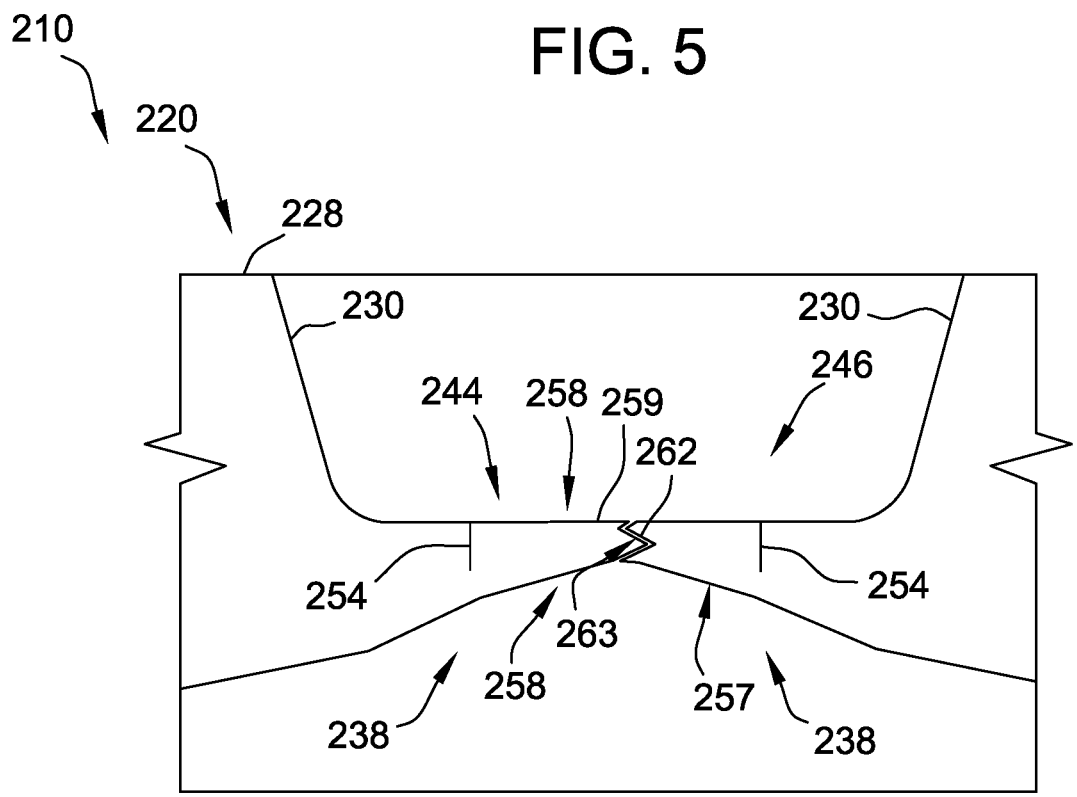
FIG. 6 is a partial plan view of a stator lamination according to another embodiment of the present invention with the tooth tips from adjacent teeth in intimate contact and with the contacting tips having rectangular cross sections and bird beak tips with the tooth tips in the machine operating position.

As shown in FIG. 6 and according to another aspect of the invention, lamination 228 is shown for use in a stator 220 for use in a motor 210. As shown, adjacent tooth tips 238, may be placed in contact with each other or in interference engagement with each other. The lamination 228 may be provided wherein, when in the first or the operating configuration as shown, the tooth tips 238 from adjacent teeth 230 are in intimate contact. When the tooth tips 238 from adjacent teeth 230 are in intimate contact, the adjacent tips may have contacting surfaces that conform and/or lock with each other. The conforming or locking may be, for example, by a concave shape on a first tip that engages a convex shape on a second tip. As shown in FIG. 6, a first tip 244 has moveable first portion 258 that has a beak shaped protrusion 259 with a beak shaped distal end 262 that mates with the V-shaped void 263 on first portion 257 of a second tip 246. As shown, living hinges 254 enable the first portions 257 and 258 to be moveable.

Figure 7:
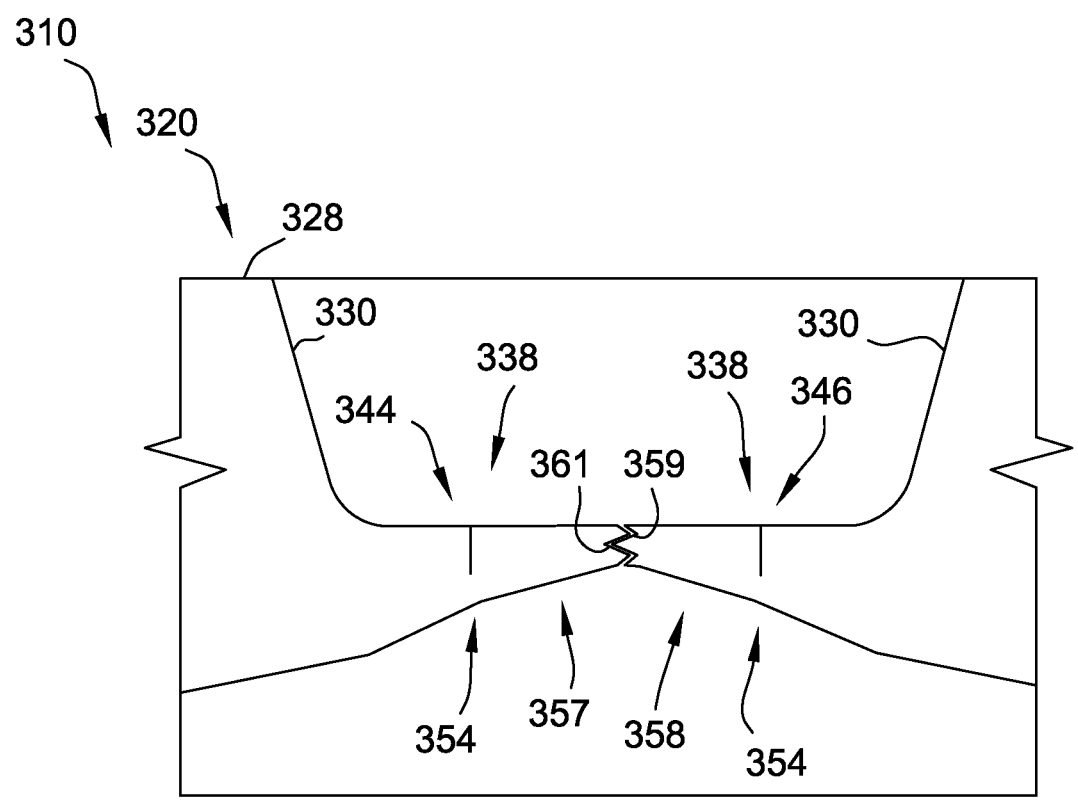
FIG. 7 is a partial plan view of a stator lamination according to another embodiment of the present invention with the tooth tips from adjacent teeth in intimate contact and with the contacting tips having rectangular cross sections and multiple bird beak tips with the tooth tips in the machine operating position.

As shown in FIG. 7 and according to another aspect of the invention, lamination 328 is shown for use in a stator 320 for use in a motor 310. As shown, adjacent tooth tips 338, may be placed in contact with each other or in interference engagement with each other. The lamination 328 may be provided wherein, when in the first or the operating configuration as shown, the tooth tips 338 from adjacent teeth 330 are in intimate contact. A first tip 344 has a moveable first portion 358 that has a plurality of beak shaped protrusions 359 that mate with a plurality of beak shaped protrusions 361 on a moveable first portion 357 of second tip 346. As shown, living hinges 354 enable the first portions 357 and 358 to be moveable.

Figure 8:
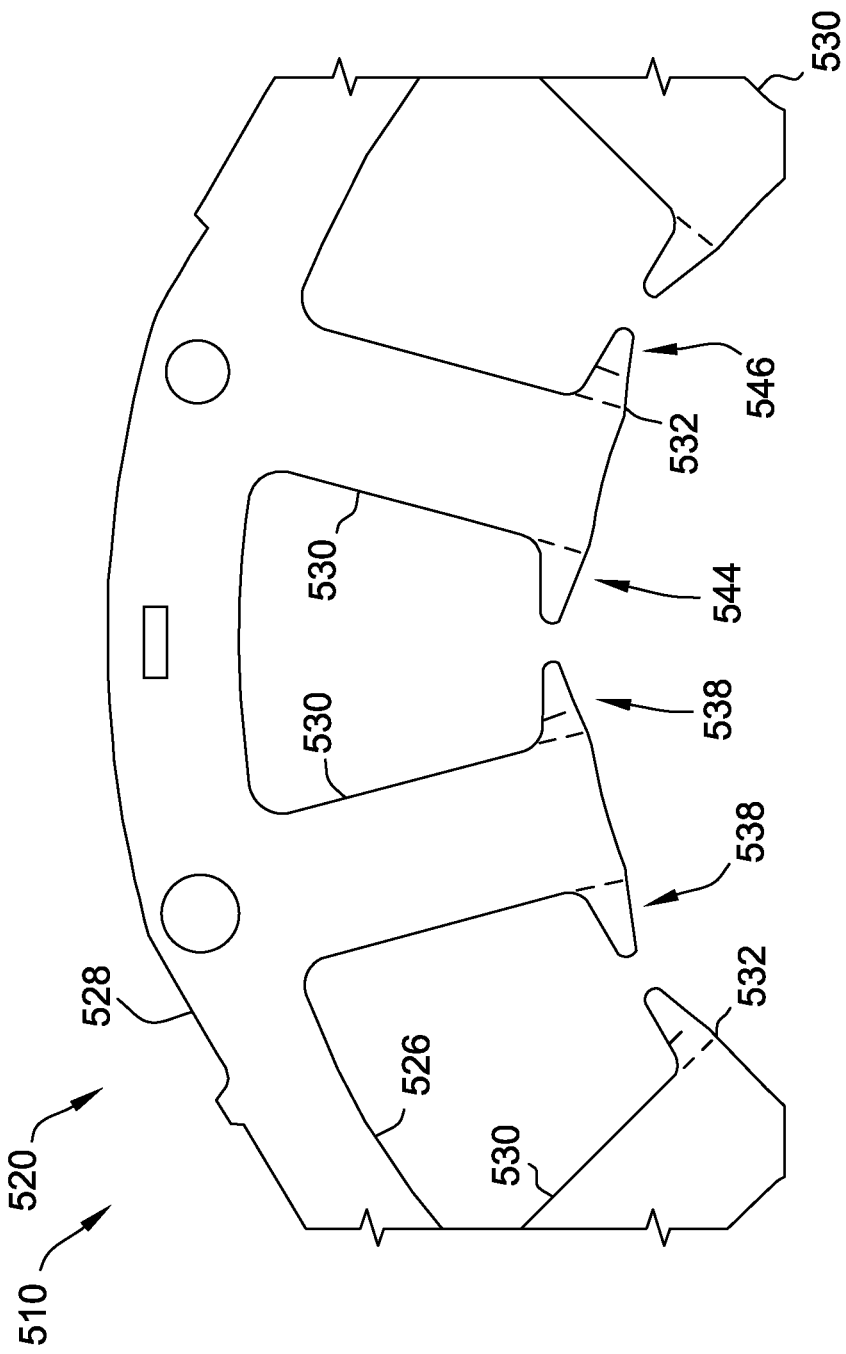
FIG. 8 is a partial plan view of a stator lamination according to another embodiment of the present invention with the contacting tooth tip pairs including a rigid tip and a living hinge tip with the tooth tips in the machine operating position.
Figure 9:
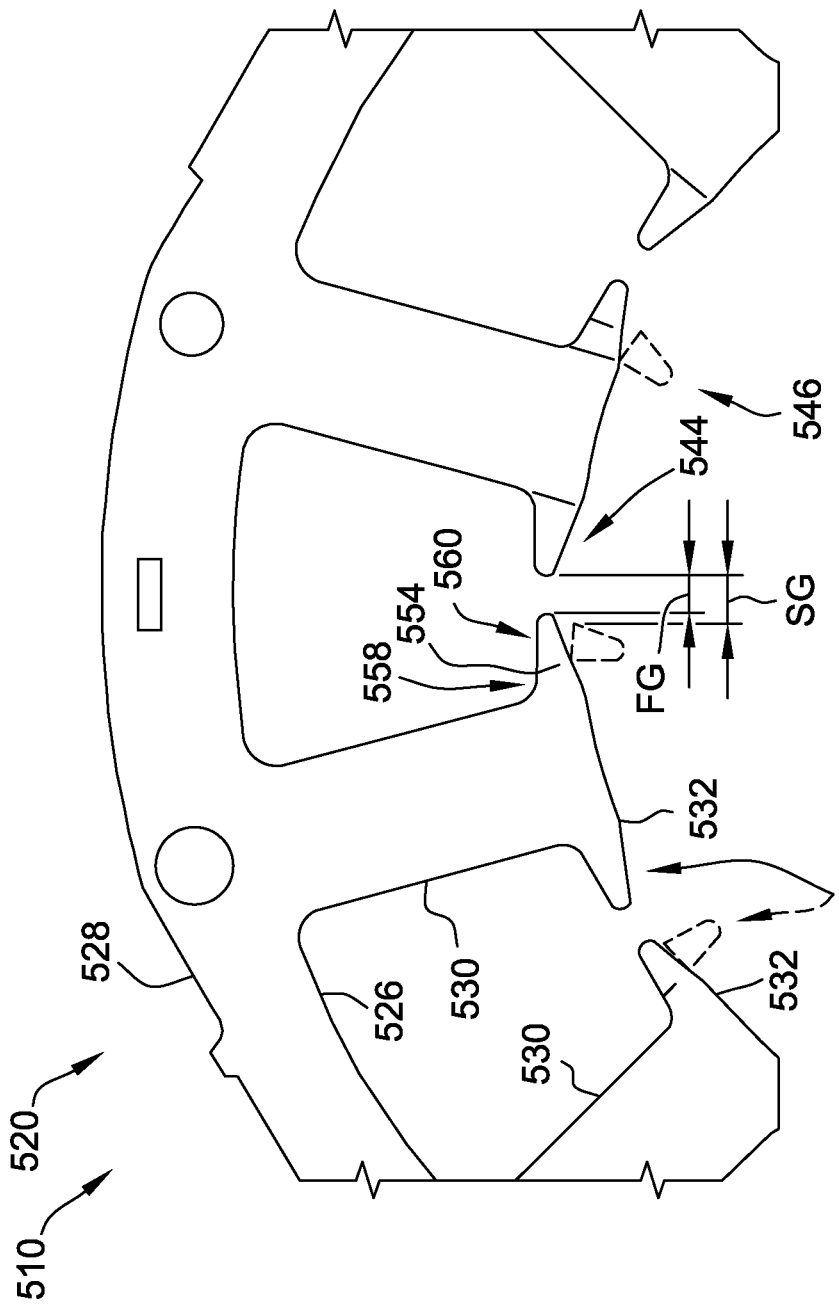
FIG. 9 is a partial plan view of the stator lamination of FIG. 8 with the tooth tips in the winding position to assist access to the stator pockets for winding.

According to another aspect of the present invention and referring now to FIGS. 8 and 9, lamination 528 is shown for use in a stator 520 for use in a motor 510. As shown, the lamination 528 includes a plurality of teeth 530 extending radially inwardly from the inner periphery 526 of the lamination 528. The lamination includes tooth tips 538 extending radially outward from inner edges 532 of the teeth 530. Adjacent tooth tips 538, may be, as shown spaced from each other. Alternatively, the adjacent tooth tips 538 may be placed in contact with each other or in interference engagement with each other. The lamination 528 may be, as shown in FIGS. 8 and 9, provided wherein, a first tip 544 is fixed and a second tip 546, adjacent to the first tip 544 includes a rigid and fixed first portion 558 extending radially from the inner edge 532 of the tooth 530, a living hinge 554 extending from the first portion 558 and a hinged second portion 560 extending from the living binge 554.

The first tip 544 and the second tip 546 define a first configuration defining a first gap FG therebetween and defining a second configuration defining a second gap SG therebetween, the first gap FG being substantially less than the second gap SG. Note that the second gap SG provides added room for a needle or other tool to wind the wire 48 around the teeth 30 to form the coils 50 (see FIGS. 1-4).

It should be appreciated that a tip, as described above, can be utilized on only one of the two adjacent inner edges of adjacent teeth of a stator or a stator lamination and still provide a desirable reduction in cogging torque in the electric machine in which it is used. For example, one of the two adjacent inner edges of adjacent teeth may have a tip and the other edge may have no tip. This alternating positioning of tips may be accomplished, for example, by having alternating teeth have either two tips or no tips or by having the left or right side adjacent inner edge of each tooth be provided with a tip and the other side adjacent inner edge of each tooth be provided with no tip.

Figure 10:
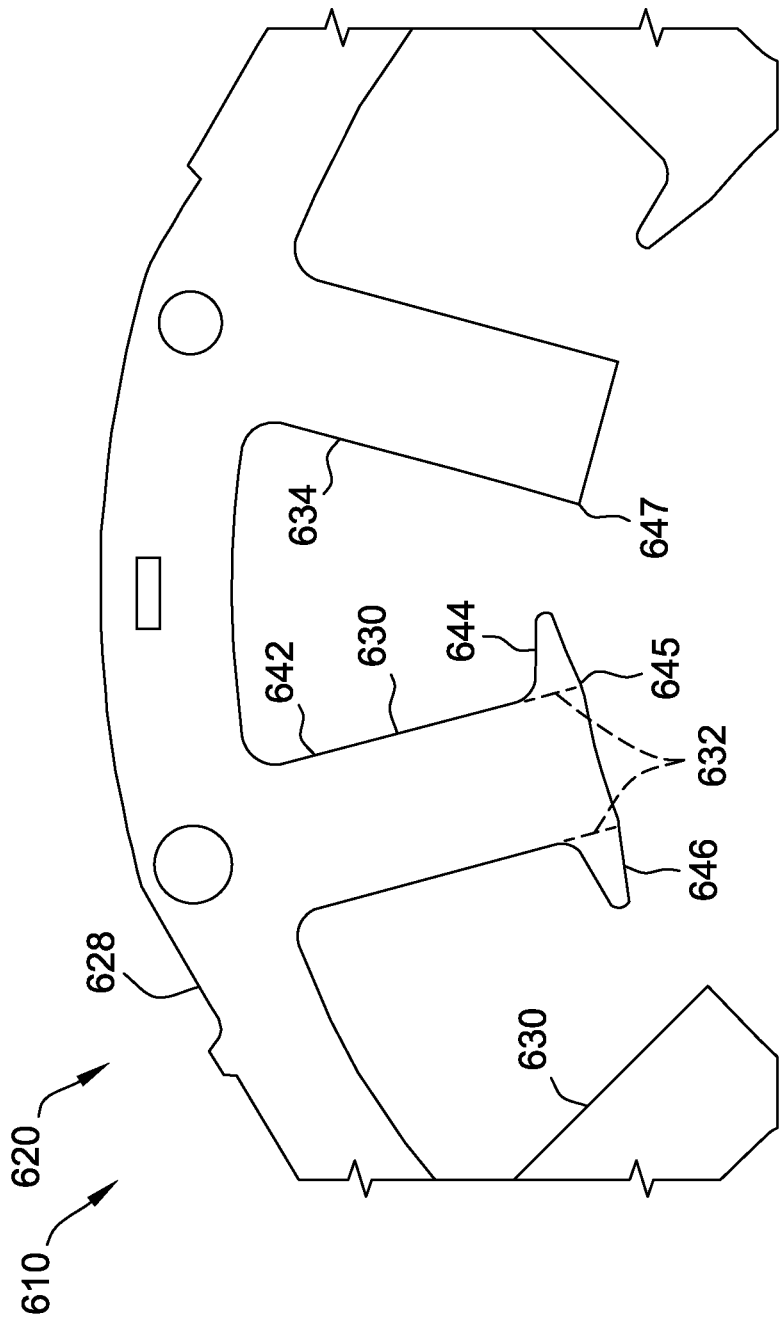
FIG. 10 is a partial plan view of a stator lamination according to another embodiment of the present invention with the adjacent tooth pairs including a tooth with rigid tips and a tooth without tips.

As shown in FIG. 10 and according to another aspect of the invention, lamination 628 is shown for use in a stator 620 for use in a motor 610. As shown, adjacent teeth 630, may be, spaced from each other. Alternatively, the adjacent teeth 630 may be placed in contact with each other or in interference engagement with each other. The lamination 628, as shown, may be provided wherein a first tip 644 is utilized on a first adjacent inner edge 645 of the two adjacent inner edges 632 of adjacent teeth of stator lamination 628. The other adjacent inner edge 647 has no tip. This alternating positioning of tips may be accomplished, for example, by having alternating teeth have either two tips or no tips. For example, a first tooth 634 has no tips and an adjacent second tooth 642 has both a first tip 644 and a second tip 646.

It should be appreciated that some or all of the tips, for example the first tip 644 and/or the second tip 646, may include living hinges, as described above.

Figure 11:
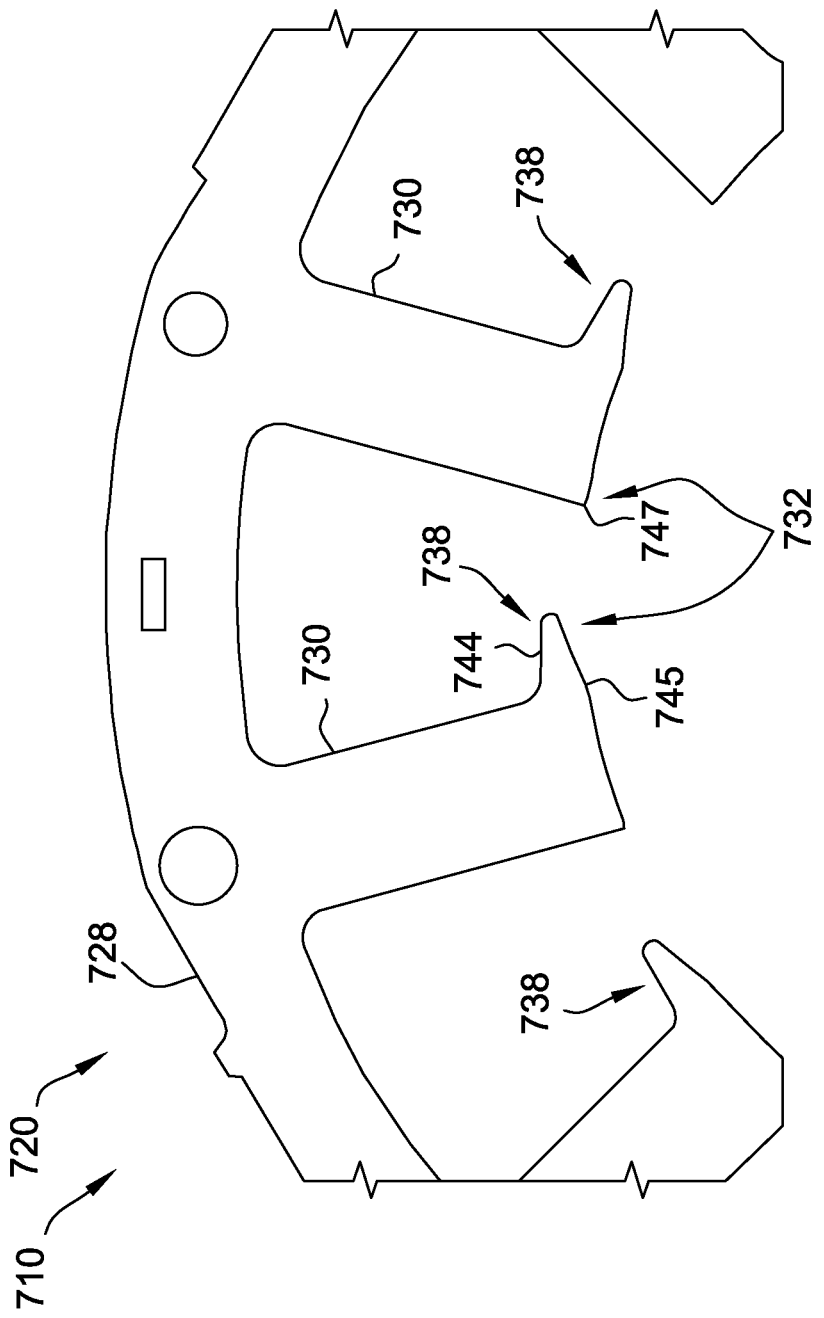
FIG. 11 is a partial plan view of a stator lamination according to another embodiment of the present invention with each tooth including a radially inward edge with a rigid tip and a radially inward edge without a tip.

As shown in FIG. 11 and according to another aspect of the invention, lamination 728 is shown for use in a stator 720 for use in a motor 710. As shown, adjacent teeth 730, may be, spaced from each other. Alternatively, the adjacent teeth 730 may be placed in contact with each other or in interference engagement with each other. The lamination 728, as shown, may be provided wherein a first tip 744 is utilized on a first adjacent inner edge 745 of the two adjacent inner edges 732 of adjacent teeth 730 of stator lamination 728. The other adjacent inner edge 747 has no tip. This alternating positioning of tips may be accomplished, for example and as shown in FIG. 11, by having the left or right side adjacent inner edge of each tooth be provided with a tip and the other side adjacent inner edge of each tooth be provided with no tip. For example, the right side adjacent inner edge 732 of each tooth 730 is provided with a tip 738 and the left side adjacent inner edge 732 of each tooth is provided with no tip.

It should be appreciated that some or all of the tips 738, for example the first tip 744 may include living hinges, as described above.

It should be appreciated that as an alternative to having tooth tips that are moveable, for example by a living hinge, the tooth tips may be removeable, with the tips being installed onto the teeth after the wire has been wound around the stator teeth.

Removeable tips can be accomplished by any suitable construction using any suitable manufacturing method. For example, the tips may be glued, welded, soldered, interferencely fitted, pressed, coined, snapped or otherwise secured to the teeth.

Figure 12:
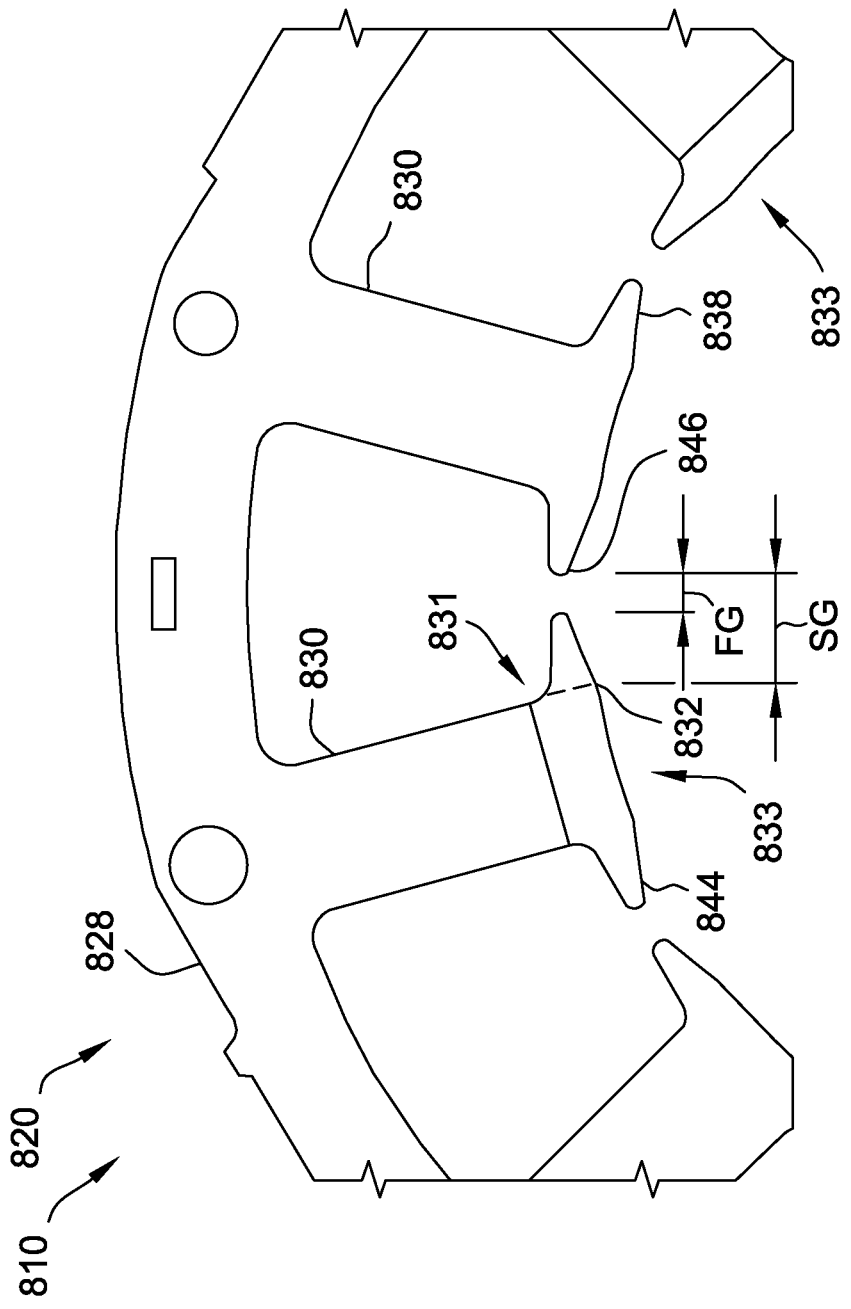
FIG. 12 is a partial plan view of a stator lamination according to another embodiment of the present invention with the adjacent tooth pairs including a tooth with rigid tips and a tooth with a separate tip with the tooth tips in the machine operating position.

Referring now to FIG. 12 and according to another aspect of the invention, lamination 828 is shown for use in a stator 820 for use in a motor 810. As shown, adjacent teeth 830, may be, spaced from each other. Alternatively, the adjacent teeth 830 may be placed in contact with each other or in interference engagement with each other. The stator 820, as shown, may be provided wherein at least one of the teeth 830 includes a cap 833 fitted to distal radially inward end 831 of the teeth 830.

The cap 833 includes at least a first tip 844 and preferably includes a second tip 846 opposed to the first tip 844. The cap 833 is fitted to the tooth 830 by any suitable construction using any suitable manufacturing method. The cap 833 may be glued, welded, soldered, interferencely fitted, pressed, coined, snapped or otherwise secured to one of the teeth 830. The cap may be made of a magnetically conductive or a magnetically insulative material or may be made of a composite material or a combination of materials, to provide any desired electrical, magnetic or strength or durability property or properties.

If the cap 833 is made of a magnetically non-conductive material, the cap 833 may reduce or eliminate the undesirable magnetic flux path between adjacent tips.

As shown in FIG. 12, the caps 833 may be position on all or only some of the teeth 830. A lower cost stator may be possible by providing the caps on only a portion of the teeth, reducing the number of caps needed for a given machine.

For example and as shown in FIG. 12, the caps 833 may be positioned on the inward end 831 of every one of the teeth 830. The teeth 830 without the caps 833 may have fixed tips 838 (as shown). As shown every other tooth 830 has a cap 833 and the other teeth have fixed tips 838. Alternately the teeth 830 without the caps 833 may have no tips or tips with living hinges as described above.

As shown in FIG. 12, the stator 820 and the caps 833 define a first configuration defining a first gap FG between adjacent tips 838 when the cap 833 is positioned on the tooth 830 and a second gap SG between a tip 838 and inner edge 832 of the tooth 830 exposed when the cap 833 is removed from the tooth 830. Note that the first gap PG is substantially less than the second gap SG. Note that the second gap SG provides added room for a needle or other tool to wind the wire 48 around the teeth 30 to form the coils 50 (see FIGS. 1-4).

Figure 13:
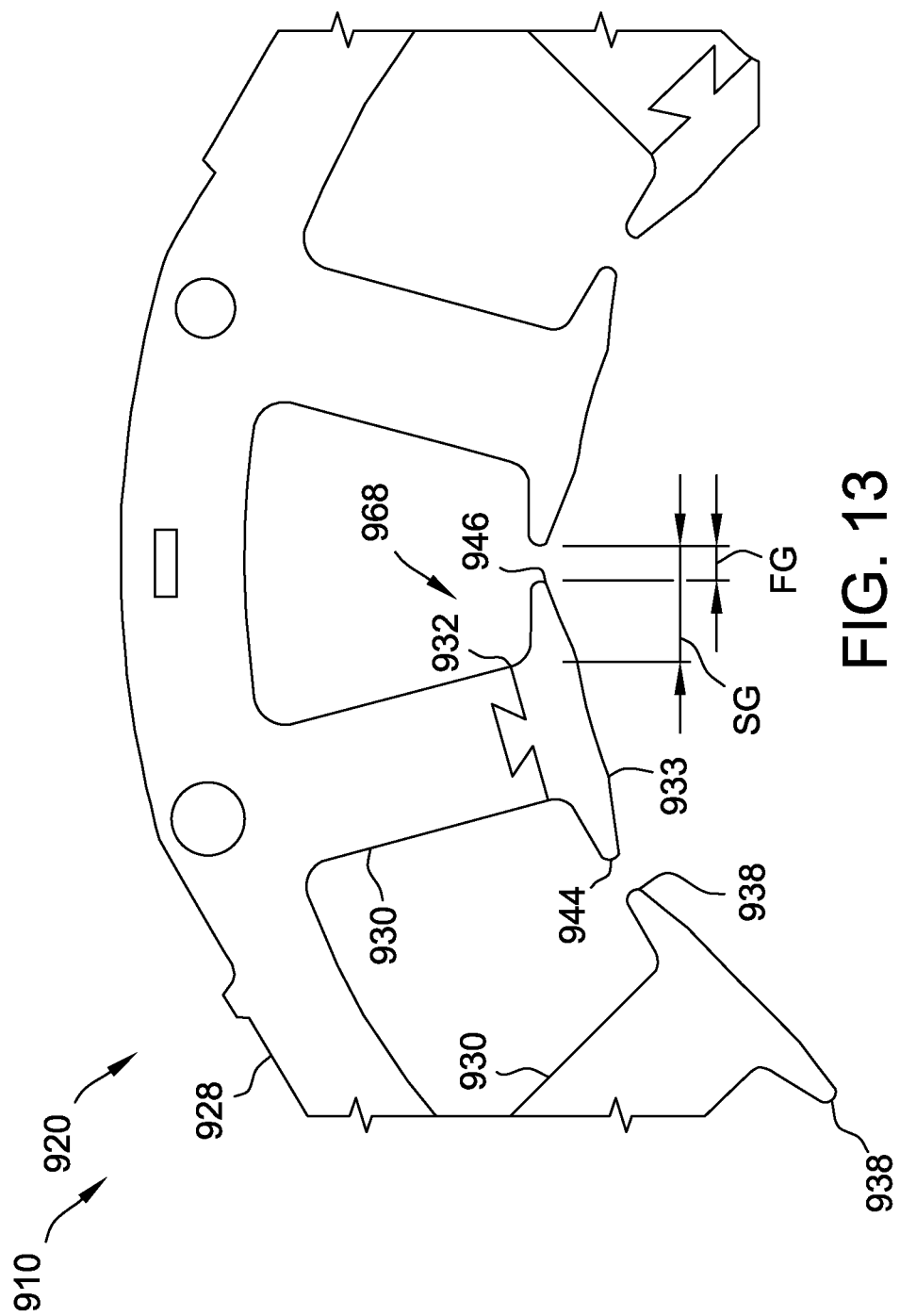
FIG. 13 is a partial plan view, partially in cross section, of a stator lamination according to another embodiment of the present invention with the adjacent tooth pairs including a tooth with rigid tips and a tooth with separate tips connected to the tooth with a dovetail connection.
Figure 14:
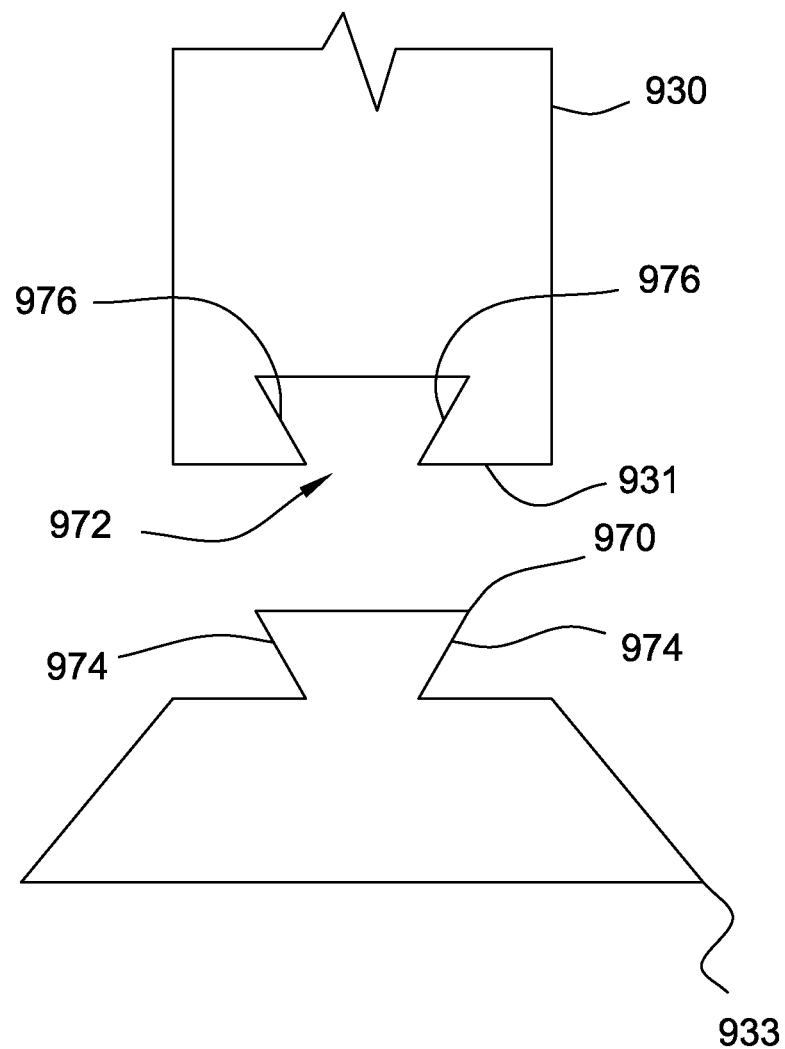
FIG. 14 is a partial exploded plan view of the stator lamination of FIG. 13.

Referring now to FIGS. 13 and 14 and according to another aspect of the invention, lamination 928 is shown for use in a stator 920 for use in a motor 910. As shown, adjacent teeth 930, may be, spaced from each other. Alternatively, the adjacent teeth 930 may be placed in contact with each other or in interference engagement with each other. The stator 920, as shown, may be provided wherein at least one of the teeth 930 includes a cap 933 fitted to distal radially inward end 931 of the teeth 930. The cap 933 includes at least a first tip 944 and preferably includes a second tip 946 opposed to the first tip. The cap 933 is fitted to the tooth 930 by a dovetail joint 968. The cap may be made of a magnetically conductive or a magnetically insulative material or may be made of a composite material or a combination of materials, to provide any desired electrical, magnetic or strength or durability property or properties.

As shown in FIG. 14, the dovetail joint 968 includes a protrusion 970 extending from one of the tooth 930 and the cap 933. The other of the tooth 930 and the cap 933 defines a void 972 for receiving the protrusion 970. As shown the cap 933 includes the protrusion 970 and the tooth 930 includes the void 972. The protrusion 970 includes opposed inclined faces 974 that engage inclined faces 976 formed in the tooth 930.

As shown in to FIGS. 13 and 14, the caps 933 may be position on all or only some of the teeth 930. A lower cost stator may be possible by providing the caps on only a portion of the teeth, reducing the number of caps needed for a given machine.

For example and as shown in FIGS. 13 and 14, the caps 933 may be positioned on the inward end 931 of every one of the teeth 930. The teeth 930 without the caps 933 may have fixed tips 938 (as shown). As shown every other tooth 930 has a cap 933 and the other teeth have fixed tips 938. Alternately the teeth 930 without the caps 933 may have no tips or tips with living hinges as described above.

As shown in to FIGS. 13 and 14, the stator 920 and the caps 933 define a first configuration defining a first gap FG between adjacent tips 938 when the cap 933 is positioned on the tooth 930 and a second gap SG between a tip 938 and inner edge 932 of the tooth 930 exposed when the cap 933 is removed from the tooth 930. Note that the first gap FG is substantially less than the second gap SG. Note that the second gap SG provides added room for a needle or other tool to wind the wire 48 around the teeth 30 to form the coils 50 (see FIGS. 1-4).

Figure 15:
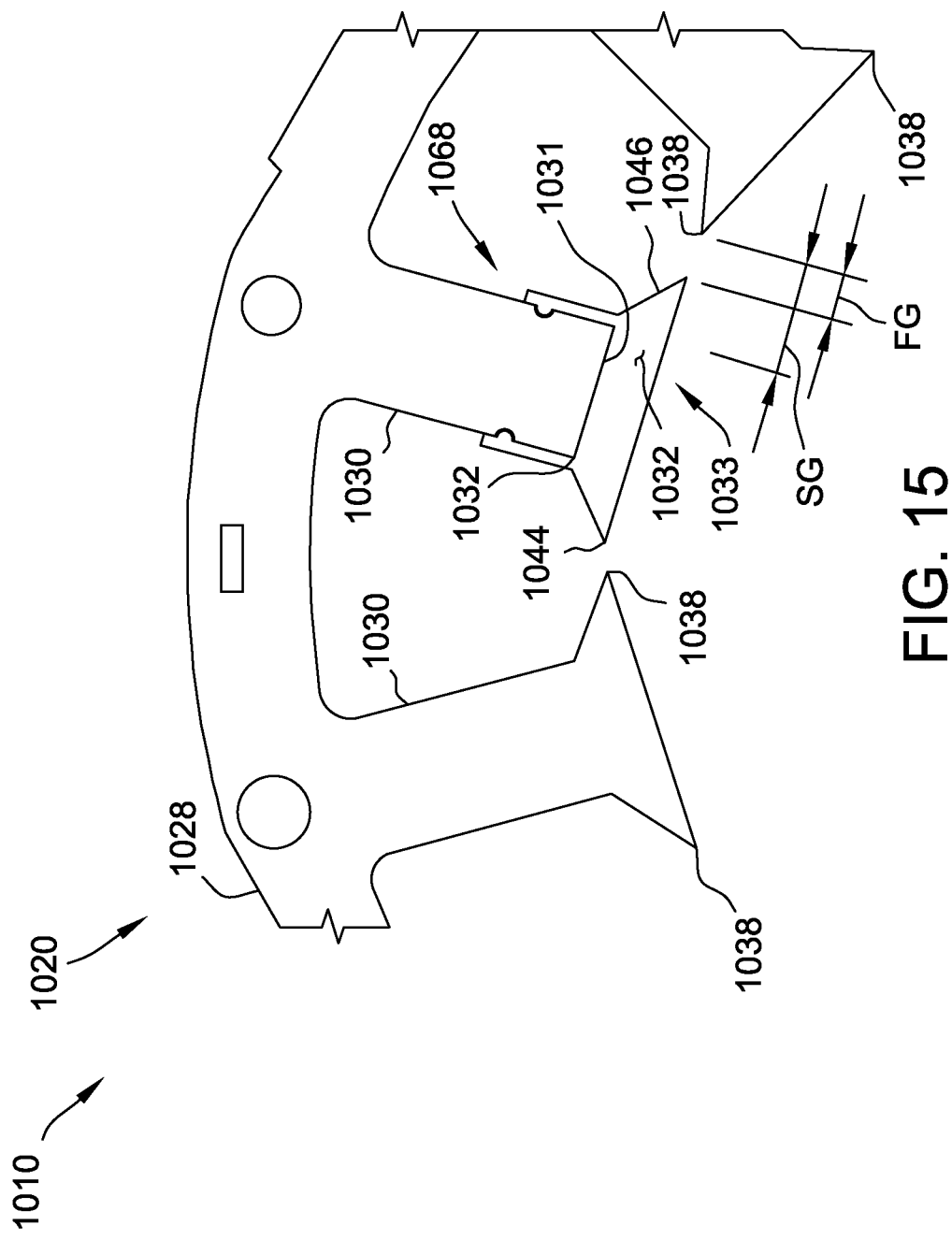
FIG. 15 is a partial plan view, partially in cross section, of a stator lamination according to another embodiment of the present invention with the adjacent tooth pairs including a tooth with rigid tips and a tooth with separate tips connected to the tooth with a snap-on connection.
Figure 16:
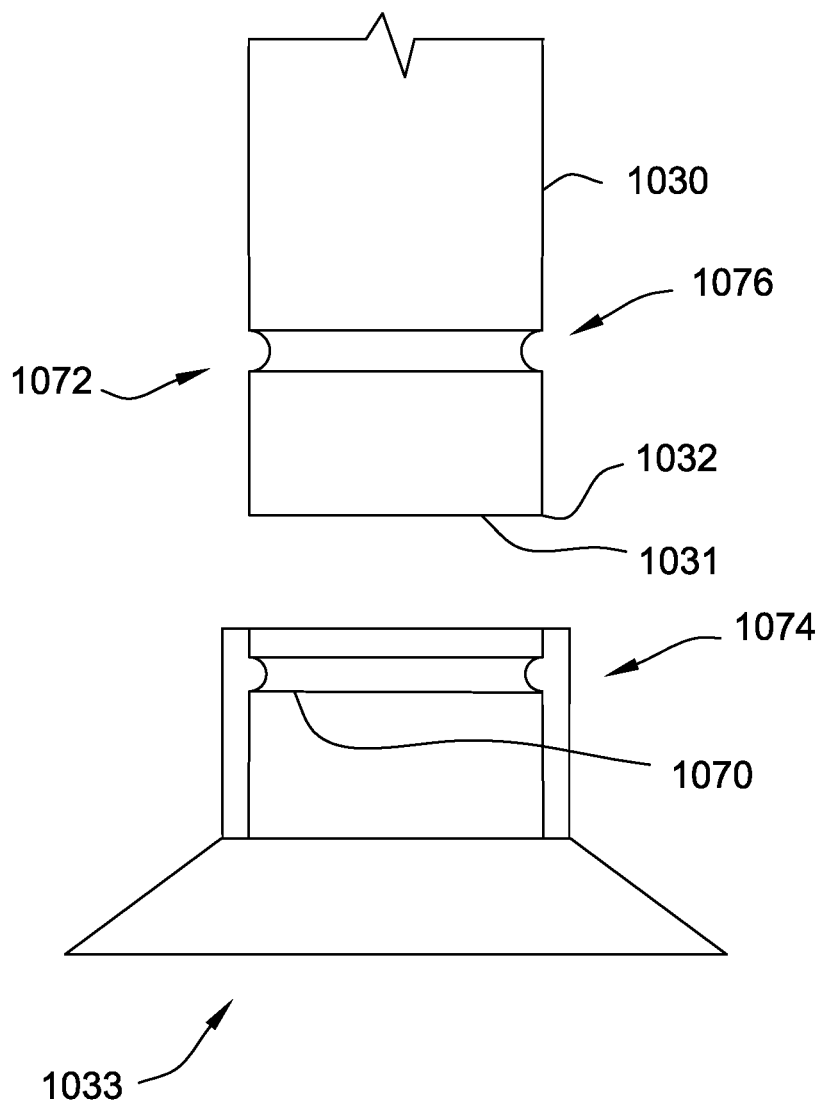
FIG. 16 is a partial exploded plan view of the stator lamination of FIG. 15.

Referring now to FIGS. 15 and 16 and according to another aspect of the invention, lamination 1028 is shown for use in a stator 1020 for use in a motor 1010. As shown, adjacent teeth 1030, may be, spaced from each other. Alternatively, the adjacent teeth 1030 may be placed in contact with each other or in interference engagement with each other. The stator 1020, as shown, may be provided wherein at least one of the teeth 1030 includes a cap 1033 fitted to distal radially inward end 1031 of the tooth 1030. The cap 1033 includes at least a first tip 1044 and preferably includes a second tip 1046 opposed to the first tip 1044. The cap 1033 is fitted to the tooth 1030 by a snap-on joint 1068. The cap 1033 may be made of a magnetically conductive or a magnetically insulative material or may be made of a composite material or a combination of materials, to provide any desired electrical, magnetic or strength or durability property or properties.

The snap-on joint 1068 includes a protrusion 1070 extending from one of the tooth 1030 and the cap 1033. The other of the tooth 1030 and the cap 1033 defines a void 1072 for receiving the protrusion 1070. As shown the cap includes the protrusion 1070 and the tooth 1030 includes the void 1072. The protrusion 1070 includes a circumferential rib 1074 that engage a circumferential groove 1076 formed in the tooth 1030. Note the protrusion 1070 may be resilient and include a lever (not shown) for releasing the protrusion 1070 from the void 1072.

As shown in to FIGS. 15 and 16, the caps 1033 may be position on all or only some of the teeth 1030. A lower cost stator may be possible by providing the caps on only a portion of the teeth, reducing the number of caps needed for a given machine.

For example and as shown in FIGS. 15 and 16, the caps 1033 may be positioned on the inward end 1031 of every one of the teeth 1030. The teeth 1030 without the caps 1033 may have fixed tips 1038. As shown every other tooth 1030 has a cap 1033 and the other teeth have fixed tips 1038. Alternately the teeth 1030 without the caps 1033 may have no tips or tips with living hinges as described above.

As shown in to FIGS. 15 and 16, the stator 1020 and the caps 1033 define a first configuration defining a first gap FG between adjacent tips 1046 and 1038 when the cap 1033 is positioned on the tooth 1030 and a second gap SG between a tip 1038 and inner edge 1032 of the tooth 1030 exposed when the cap 1033 is removed from the tooth 1030. Note that the first gap FG is substantially less than the second gap SG. Note that the second gap SG provides added room for a needle or other tool to wind the wire 48 around the teeth 30 to form the coils 50 (see FIGS. 1-4).

Figure 17:
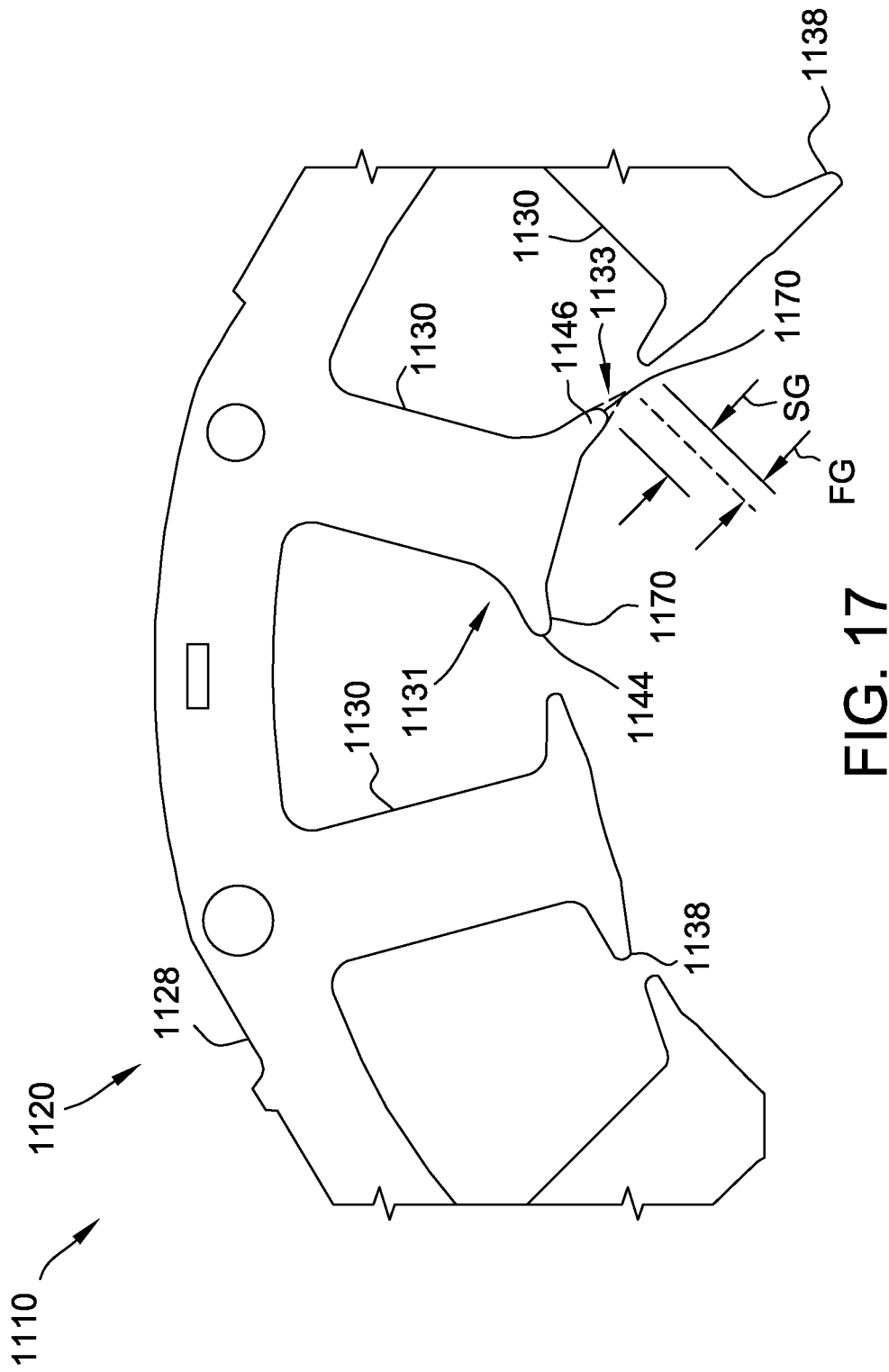
FIG. 17 is a partial plan view, partially in cross section, of a stator lamination according to another embodiment of the present invention with a formable tip of a stator tooth with the tooth tip in the winding position to assist access to the stator pockets for winding.
Figure 18:
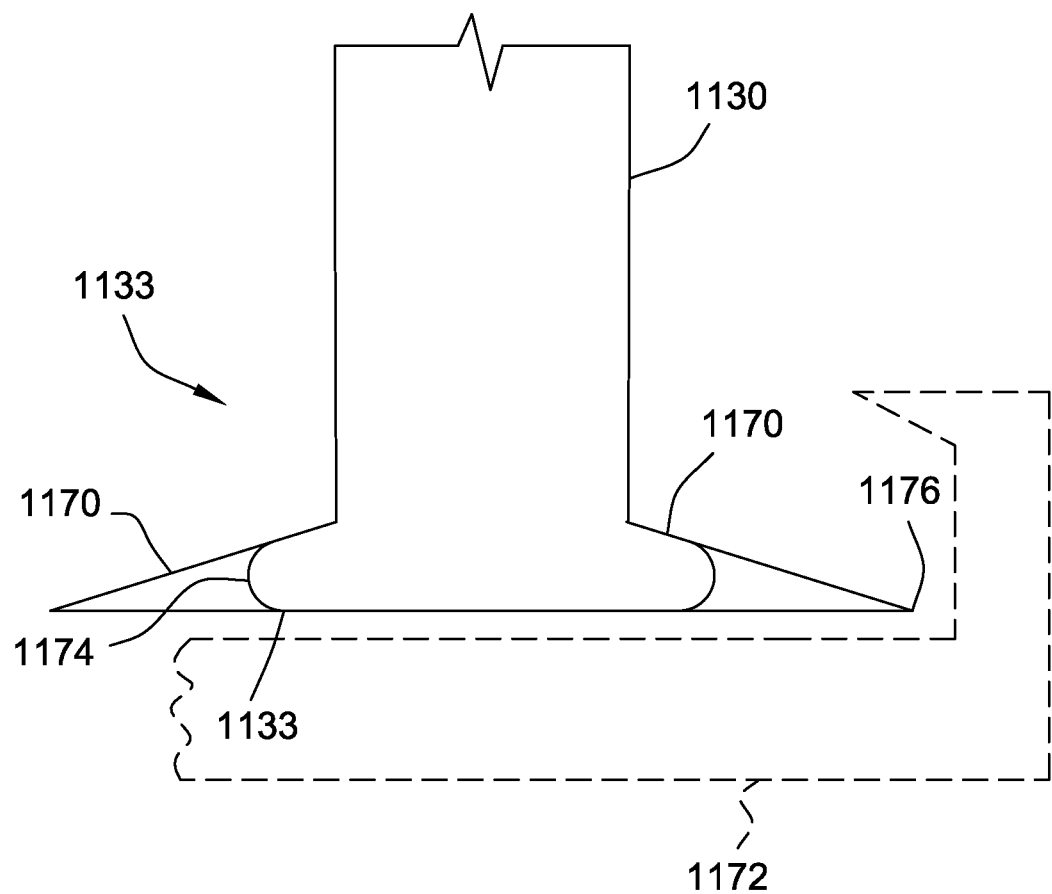
FIG. 18 is a partial exploded plan view of the stator lamination of FIG. 17 engaged with a forming tool to form the tooth tip into the machine operating position.

Referring now to FIGS. 17 and 18 and according to another aspect of the invention, lamination 1128 is shown for use in a stator 1120 for use in a motor 1110. As shown, adjacent teeth 1130, may be, spaced from each other. Alternatively, the adjacent teeth 1130 may be placed in contact with each other or in interference engagement with each other. The stator 1120, as shown, may be provided wherein at least one of the teeth 1130 includes an integral formable end 1133 positioned on distal radially inward end 1131 of the teeth 1130. The formable end 1133 includes at least a first tip 1144 and preferably includes a second tip 1146 opposed to the first tip 1144. The formable end 1133 is integral with the tooth 1130. The formable end 1133 may be made of a magnetically conductive or a magnetically insulative material or may be made of a composite material or a combination of materials, to provide any desired electrical, magnetic, strength or durability property or properties.

The formable end 1133 includes opposed formable protrusions 1170. A tool 1172 fits over the formable protrusions 1170 and provide for a first formable protrusion shape 1174 for use in winding the stator 1120 and a second formable protrusion shape 1176 for use during operation of the machine 1010.

As shown in to FIGS. 17 and 18, the formable ends 1133 may be position on all or only some of the teeth 1130. A lower cost stator may be possible by providing the caps on only a portion of the teeth, reducing the number of formable ends 1133 needed for a given machine.

For example and as shown in FIGS. 17 and 18, the formable ends 1133 may be positioned on the inward end 1131 of every one of the teeth 1130. The teeth 1130 without the caps 1133 may have fixed tips 1138 (as shown). As shown every other tooth 1130 has formable ends 1133 and the other teeth have fixed tips 1138. Alternately the teeth 1130 without the formable ends 1133 may have no tips or tips with living hinges as described above.

As shown in to FIGS. 17 and 18, the stator 1120 and the formable ends 1133 define a first configuration defining a first gap FG between adjacent tips 1138 of the tooth 1130 when formable ends 1133 are in first formable protrusion shape 1174 for use in winding the stator 1120 and a second gap SG between adjacent tips 1138 of the tooth 1130 when formable ends 1133 are in a second formable protrusion shape 1176 for use during operation of the machine. Note that the first gap FG is substantially less than the second gap SG. Note that the second gap SG provides added room for a needle or other tool to wind the wire 48 around the teeth 30 to form the coils 50 (see FIGS. 1-4).

Figure 19:
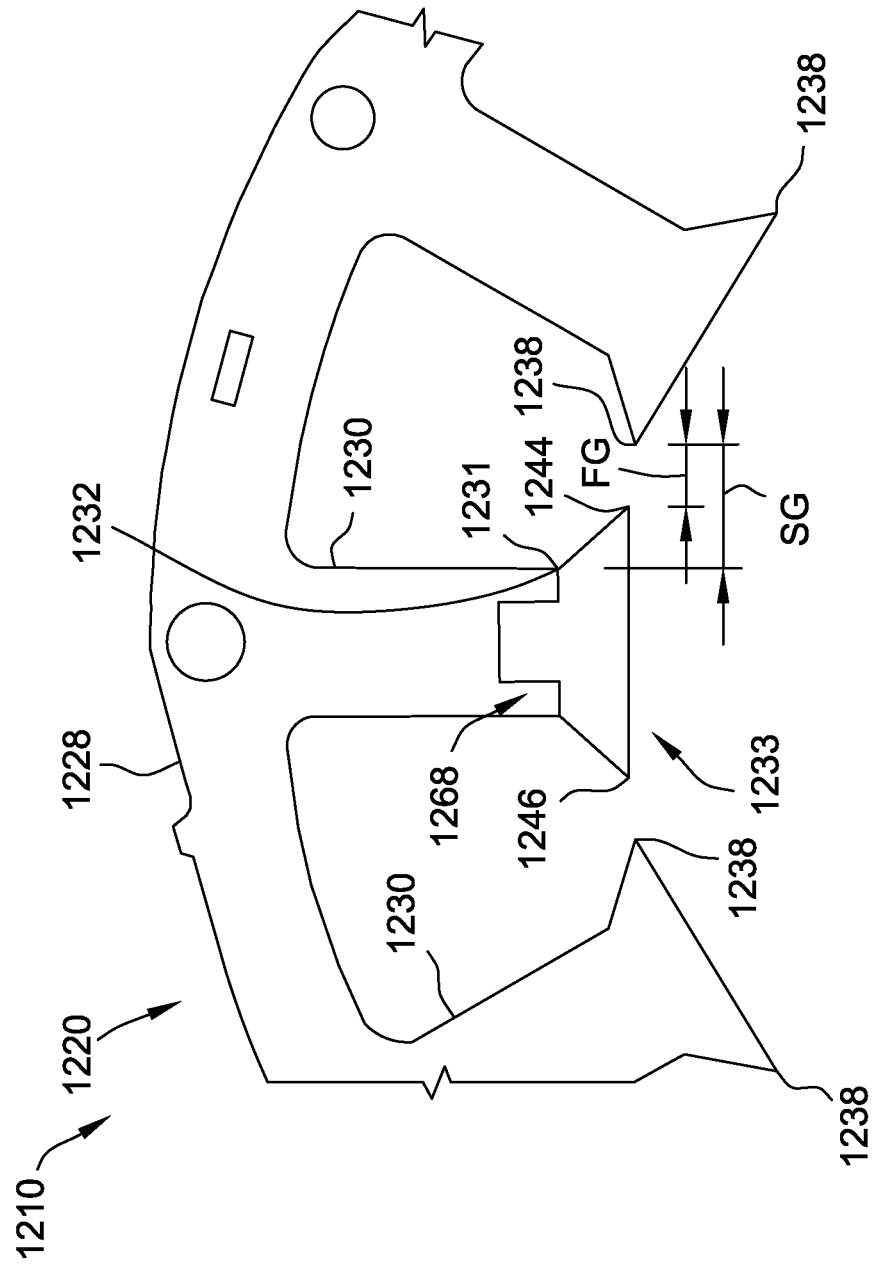
FIG. 19 is a partial plan view, partially in cross section, of a stator lamination according to another embodiment of the present invention with the adjacent tooth pairs including a tooth with rigid tips and a tooth with separate tips connected to the tooth with a fitted connection.
Figure 20:
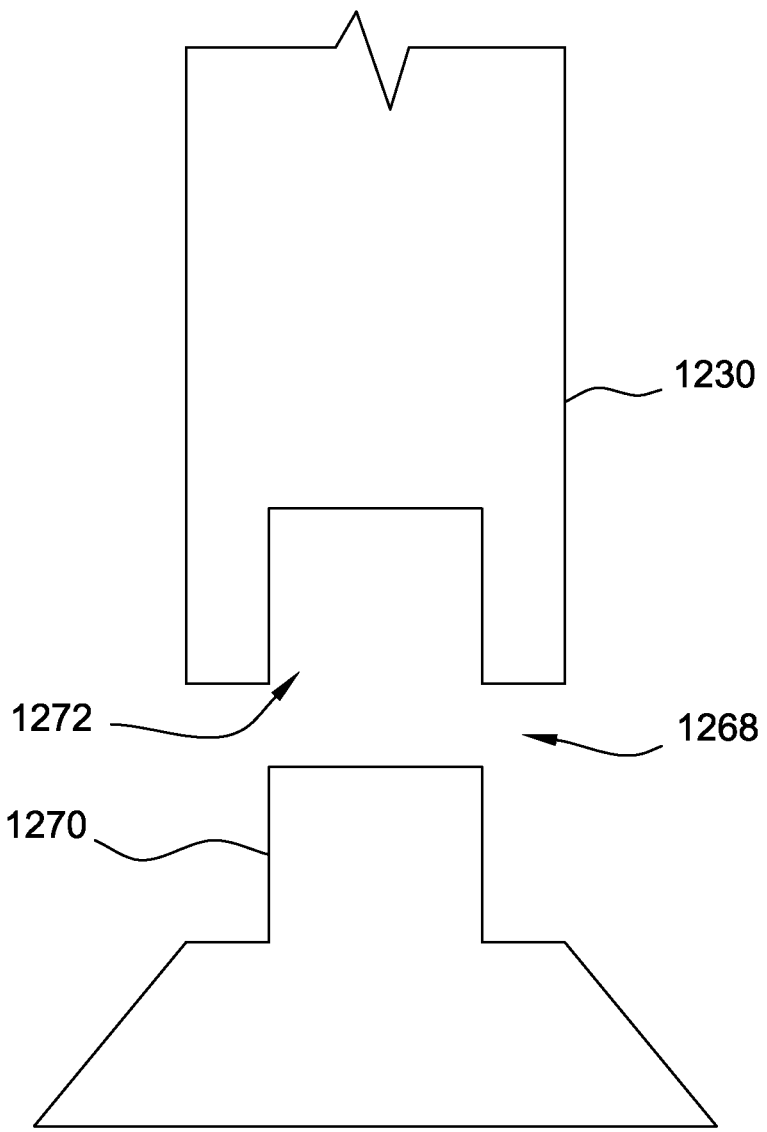
FIG. 20 is a partial exploded plan view of the stator lamination of FIG. 19.

Referring now to FIGS. 19 and 20 and according to another aspect of the invention, lamination 1228 is shown for use in a stator 1220 for use in a motor 1210. As shown, adjacent teeth 1230, may be, spaced from each other. Alternatively, the adjacent teeth 1230 may be placed in contact with each other or in interference engagement with each other. The stator 1220, as shown, may be provided wherein at least one of the teeth 1230 includes a cap 1233 fitted to distal radially inward end 1231 of the teeth 1230. The cap 1233 includes at least a first tip 1244 and preferably includes a second tip 1246 opposed to the first tip 1244. The cap 1233 is fitted to the tooth 1230 by a slip-on joint 1268. The cap 1233 may be made of a magnetically conductive or a magnetically insulative material or may be made of a composite material or a combination of materials, to provide any desired electrical, magnetic or strength or durability property or properties.

The slip-on joint 1268 includes a protrusion 1270 extending from one of the tooth 1230 and the cap 1233. The other of the tooth 1230 and the cap 1233 defines a void 1272 for receiving the protrusion 1270. As shown the cap 1233 includes the protrusion 1270 and the tooth 1230 includes the void 1272. The protrusion 1270 may nave any shape and may have a uniform cross section and may as shown be cylindrical. Note the protrusion 1270 may be tapered to enhance securing it to the void 1272. The protrusion 1270 engages the void 1272 formed in the tooth 1230. Note the void 1272 may have a shape that conforms to the protrusion 1270 to assist in its rigid securement to the stator 1220. Note the protrusion 1270 may be resilient and include a lever (not shown) for releasing the protrusion 1270 from the void 1272.

As shown in to FIGS. 19 and 20, the caps 1233 may be positioned on all or only on some of the teeth 1230. A lower cost stator may be possible by providing the caps on only a portion of the teeth, reducing the number of caps needed for a given machine.

For example and as shown in FIGS. 19 and 20, the caps 1233 may be positioned on inward end 1231 of every one of the teeth 1230 or, as shown, on every other tooth 1230. The teeth 1230 without the caps 1233 may have fixed tips 1238 (as shown). As shown every other tooth 1230 has a cap 1233 and the other teeth have fixed tips 1238. Alternately the teeth 1230 without the caps 1233 may have no tips or tips with living hinges as described above.

As shown in to FIGS. 19 and 20, the stator 1220 and the caps 1233 define a first configuration defining a first gap FG between adjacent tips 1238 when the cap 1233 is positioned on the tooth 1230 and a second gap SG between a tip 1238 and inner edge 1232 of the tooth 1230 exposed when the cap 1233 is removed from the tooth 1230. Note that the first gap FG is substantially less than the second gap SG. Note that the second gap SG provides added room for a needle or other tool to wind the wire 48 around the teeth 30 to form the coils 50 (see FIGS. 1-4).

Figure 21A:
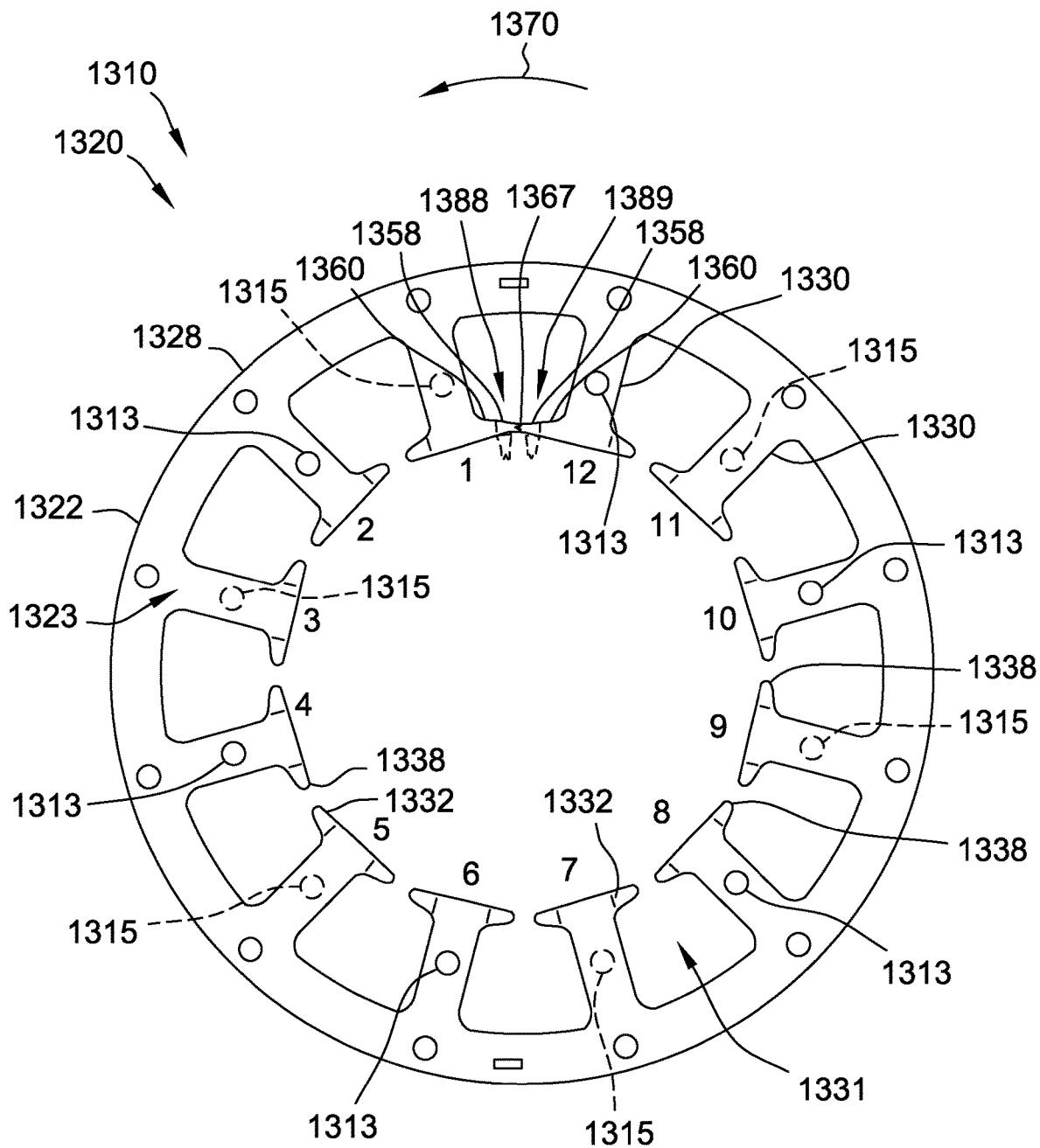
FIG. 21A is a plan view of a stator lamination according to another embodiment of the present invention with a pair of tips formable into intimate contact with each other to improve the rigidity so that a plurality of these laminations may be assembled with the tips in intimate contact with each other improving rigidity when formed into a stator for use in an electric machine.

As shown in FIG. 21A and according to another aspect of the invention, lamination 1328 is shown for use in a stator 1320 for use in a motor 1310.

The electric machine 1310 is manufactured with the stator 1320 constructed with a body 1322 made by stacking adjacent planar faces 1323 of adjacent lamination 1320 together. The laminations may include protrusions 1313 and recesses 1315 which mate with each other to connect the adjacent planar faces 1323 of adjacent lamination 1320 together. The protrusions 1313 and recesses 1315 may be on opposed faces of the laminations so that they can interconnect. Note every tooth 1330 may have a recess 1315 on one face and a protrusion 1313 on the opposed face.

As shown in FIG. 21A, the lamination 1328 includes a plurality of teeth 1330. The teeth 1330 are spaced apart from each other and extend radially inwardly to form pockets 1331 between adjacent teeth 1330 to provide for the wrapping of electrical wire around the teeth 1330 to form coils.

The pockets 1331 between adjacent teeth 1330 when the rotor rotates about the stator to produce torque and power in the motor to propel machinery etc., causes non-uniformity in torque as the motor rotates. This non-uniformity is commonly called "cogging torque" and leads to motor and resultant machinery noise and/or vibration.

As shown in FIGS. 21A and 21A, the lamination 1328 includes tips or protrusions 1338 that are added to the radially inward teeth edges 1332 to reduce the effective space between adjacent teeth 1330 to reduce this cogging torque. The tips or protrusions 1338, however, further limit access to the pockets 1331 between adjacent teeth 1330 where the coils are formed during the winding. Note that a needle needs to pass between adjacent teeth 1330 and thus between the adjacent tips or protrusions 1338.

According to an aspect of the invention at least one of the tips 1338 includes first or fixed portion 1360 that extends radially outward from inner edge 1332 of tooth 1330. A living hinge 1354 extends radially outward from the first or fixed portion 1360 of the tip 1330. A moveable first portion 1358 extends radially outward from the living hinge 1354 of the tip 1330. To benefit fully from this aspect, all of the tips 1338 preferably have the living hinge 1354 and the fixed portion 1360 and the moveable portion 1358.

While the lamination 1328, as shown in FIG. 21A, is constructed with all the lips 1338 including living hinges 1354, it should be appreciated that some of the lips may be fixed, not having a moveable portion. In such a configuration a lip with a living hinge may be paired with a fixed lip so that the needle may be used when the lip with a living hinge is opened to permit the needle to wind the coil.

As shown in FIG. 21A and according to an aspect of the invention, at least one lip 1388 is in contact, for example in intimate or interference contact with another lip 1389. As shown in FIG. 21A, all the other lips 1338 are space from every other lip to reduce any undesired flux path of the magnetic field between adjacent tooth tips 1338.

As shown, a magnetically non-conductive separator 1367 may be placed between lip 1388 and lip 1389. The separator

1367 may reduce any undesired flux path of the magnetic field between otherwise intimately contacting tooth tips 1388 and 1389.

Figure 21B:
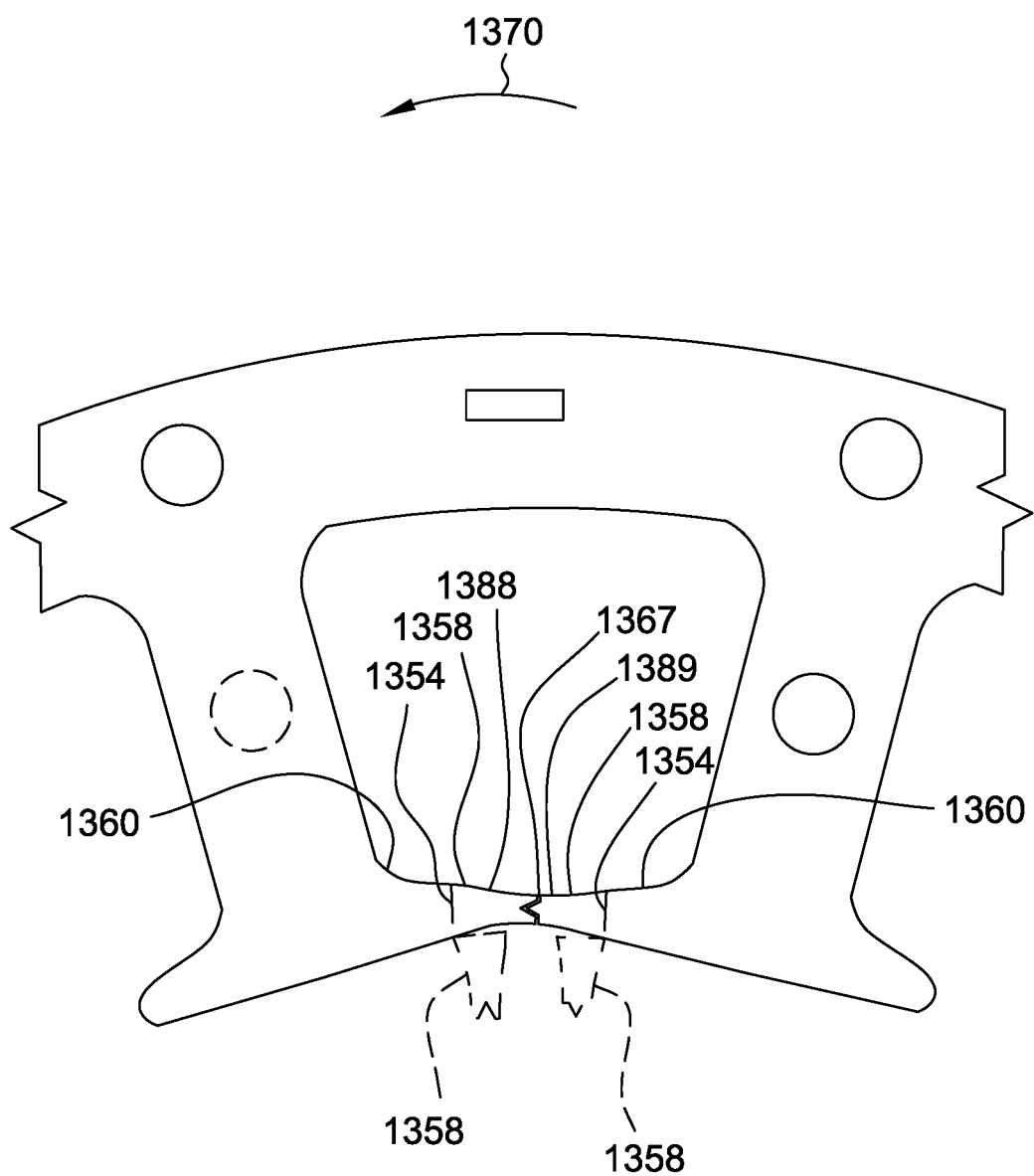
FIG. 21B is a partial plan view of the lamination of FIG. 21A, showing the pair of formable tips in greater detail

As shown in FIG. 21A and FIG. 21B the moveable first portions 1358 of the lip 1388 and lip 1389 are shown in solid in intimate contact and in phantom disengaged with each other to permit the winding of the coils around the teeth 1330.

According to an aspect of the invention and the laminations 1328 may be assembled to each other to form the stator 1320 by radially staggering the location of the contacting tooth tips 1388 and 1389.

For example and as shown in FIG. 21A, the lamination 1328 has 12 teeth 1330 each numbered consecutively in a counterclockwise direction with a number from 1 to 12. As shown the intimately contacting tooth tips 1388 and 1389 are positioned on teeth 1 and 12, respectively. It should be appreciated that the stator 1320 may be constructed by positioning the top lamination as shown in FIG. 21A and to position the second or next lower lamination rotated 30 degrees (1/12 of a revolution) in a counterclockwise direction of arrow 1370 with the intimately contacting tooth tips 1388 and 1389 of the second lamination positioned radially aligned between teeth 2 and 1 of the first lamination.

Similarly, one would position the third or next lower lamination rotated 30 degrees (1/12 of a revolution) in a counterclockwise direction with the intimately contacting tooth tips 1388 and 1389 of the third lamination positioned radially aligned between teeth 3 and 2 of the first lamination. Subsequent laminations would be positioned rotated 30 degrees (1/12 of a revolution) in a counterclockwise direction Other arrangements to stagger the radial position intimately contacting tooth tips 1388 and 1389 of the laminations may be suitable as well. Note that the protrusions 1313 and recesses 1315 may be used to align and connect the laminations 1328. It should be appreciated that other and additional pairs of tooth tips of the laminations 1328 may be in intimate contact.

Alternatively and as shown in FIG. 21A, every other tooth 1330 has one protrusion 1313 and the other teeth have a recess 1315 (on the other side). This arrangement encourages the staggering of lips 1388 and 1389 that are intimate or interference contact with each other. Note laminations may be connected by other methods including the use of adhesives (not shown).

It should be appreciated that the intimately contacting tooth tips 1388 and 1389 add rigidity to the stator 1320. Positioning the intimately contacting tooth tips 1388 and 1389 in a staggered fashion around the entire periphery of the stator 1320 further assists in improving the rigidity of the stator. Further, any reduction in motor performance caused by undesired flux patterns through the intimately contacting tooth tips 1388 and 1389 may be minimized and any improvement in cogging torque reduction resulting from the intimately contacting tooth tips 1388 and 1389 may be optimized by positioning the intimately contacting tooth tips 1388 and 1389 in a staggered fashion around the entire periphery of the stator 1320.

Figure 22A:
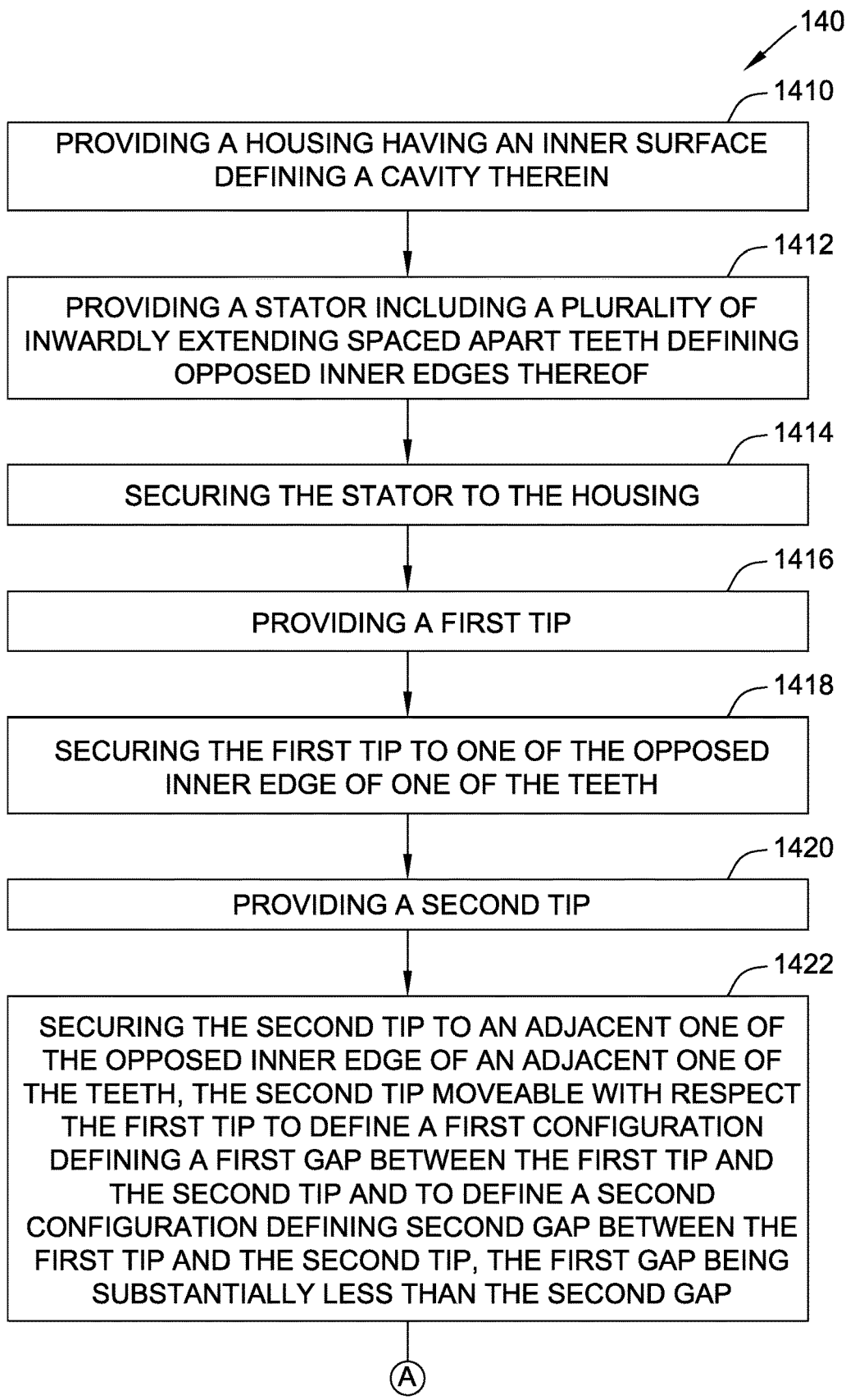
FIGS. 22A and 22B is a schematic flow chart of a method for making an electric machine according to another embodiment of the present invention.
Figure 22B:
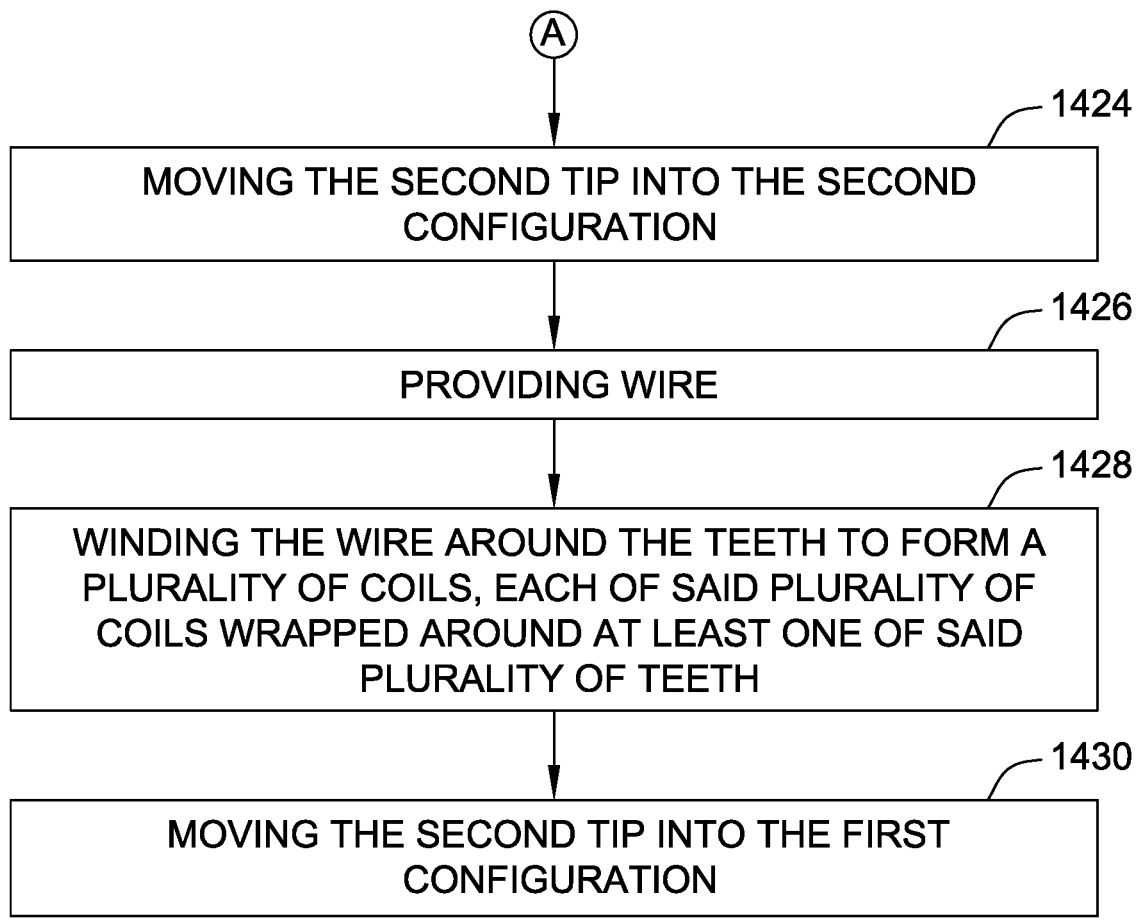

Referring now to FIG. 22A and FIG. 22B, another aspect of the present invention is provided as method 1400 for making an electric machine. The method 1400 includes step 1410 of providing a housing having an inner surface defining a cavity therein and step 1412 of providing a stator including a plurality of inwardly extending spaced apart teeth defining opposed inner edges thereof. The method 1400 further includes step 1414 of securing the stator to the housing and step 1416 of providing a first tip. The method 1400 further includes step 1418 of securing the first tip to one of the opposed inner edge of one of the teeth and step 1420 of providing a second tip.

The method 1400 further includes step 1422 of securing the second tip to an adjacent one of the opposed inner edge of an adjacent one of the teeth. The second tip is moveable with respect the first tip to define a first configuration defining a first gap between the first tip and the second tip and to define a second configuration defining second gap between the first tip and the second tip, the first gap being substantially less than the second gap. The method 1400 further includes step 1424 of moving the second tip into the second configuration and step 1426 of providing wire.

The method 1400 further includes step 1428 of winding the wire around the teeth to form a plurality of coils. Each of the plurality of coils is wrapped around at least one of the plurality of teeth. The method 1400 further includes step 1430 of moving the second tip into the first configuration.

According to another aspect of the invention, the method 1400 may further includes a step of providing a rotor and a step of rotatably securing the rotor to the housing.

According to another aspect of the invention, the method 1400 may be provided wherein the step 1420 of providing a second tip includes providing a stator with a second tip connected to the tooth by a living hinge According to an aspect of the present invention, the method 1400 may be provided wherein the step 1420 of providing a second tip includes providing a cap with a second tip that is removable from the teeth of the stator, wherein the step 1424 of moving the second tip into the second configuration includes removing the cap from the tooth and wherein the step 1430 of moving the second tip into the first configuration includes installing the cap onto the tooth The methods, systems, and apparatus described herein facilitate efficient and economical assembly of an electric machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing stators and stator laminations that reduce material and/or labor costs or provide additional space for winding the motor. Furthermore, the exemplary methods system and apparatus achieve increased wire fill on the stator and thereby increased efficiency while reducing or eliminating cogging torque in the machine. The methods, system and apparatus described herein may be used in any suitable application. However, they are particularly suited for HVAC and pump applications.

Exemplary embodiments of the stator laminations are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lamination for use in an electric machine stator, comprising:
   a body having a generally circular outer periphery and a generally circular inner periphery, spaced from the outer periphery;
   a plurality of spaced apart teeth extending inwardly from the circular inner periphery, each of said teeth defining opposed inner edges thereof;
   a first pair of tips extending tangentially in opposed directions from the inner edges of one of said teeth;
   a second pair of tips extending tangentially in opposed directions from the inner edges of another one of said teeth, a tip of said first pair of tips and a tip of said second pair of tips defining a first configuration defining a first gap therebetween and defining a second configuration defining a second gap therebetween, the first gap being substantially less than the second gap, and wherein the second gap is smaller than a distance between adjacent teeth; and
   wherein at least one of said tip of said first pair of tips and said tip of said second pair of tips comprises a living hinge, and wherein said living hinge is circumferentially spaced from said inner edges.

2. The lamination as in claim 1, wherein at least one of said tip of said first pair of tips and said tip of said second pair of tips comprises a first portion and a second portion, the first portion pivotally connected to the second portion.

3. The lamination as in claim 2, wherein said first portion extends circumferentially from said at least one inner edge and wherein said second portion extends circumferentially from said first portion.

4. The lamination as in claim 2, wherein said first portion is fixed with respect to said inner edge.

5. The lamination as in claim 1, wherein at least one of said tip of said first pair of tips and said tip of said second pair of tips comprises a first portion having a radially inward face and a second portion having a radially inward face, the first portion pivotally connected to the second portion at the radially inward face of the first portion and at the radially inward face of the second portion.

6. A stator for an electric machine comprising:
   a plurality of laminations, each of said plurality of laminations defining opposed planar faces, the plurality of laminations joined to each other at the planar faces thereof, each of said plurality of laminations comprising;
   a body having a generally circular outer periphery and a generally circular inner periphery, spaced from the outer periphery;
   a plurality of spaced apart teeth extending inwardly from the circular inner periphery, each of said teeth defining opposed inner edges thereof;
   a first pair of tips extending tangentially in opposed directions from the inner edges of one of said teeth; and
   a second pair of tips extending tangentially in opposed directions from the inner edges of another one of said teeth, a tip of said first pair of tips and a tip of said second pair of tips defining a first configuration defining a first gap therebetween and defining a second configuration defining a second gap therebetween, the first gap being substantially less than the second gap, and wherein the second gap is smaller than a distance between adjacent teeth;
   a wire formed into a plurality of coils, each of said plurality of coils wrapped around one of said plurality of teeth; and
   wherein at least one of said tip of said first pair of tips and said tip of said second pair of tips comprises a living hinge, and wherein said living hinge is circumferentially spaced from said inner edges.

7. The stator as in claim 6, wherein at least one of said tip of said first pair of tips and said tip of said second pair of tips comprises a first portion and a second portion, the first portion pivotally connected to the second portion.

8. The stator as in claim 7, wherein said first portion extends circumferentially from said at least one inner edge and wherein said second portion extends circumferentially from said first portion.

9. The stator as in claim 7, wherein said first portion is fixed with respect to said inner edge.

10. The stator as in claim 6, wherein at least one of said tip of said first pair of tips and said tip of said second pair of tips comprises a first portion having a radially inward face and a second portion having a radially inward face, the first portion pivotally connected to the second portion at the radially inward face of the first portion and at the radially inward face of the second portion.

* * * * *